(12) United States Patent
Spanoche et al.

(10) Patent No.: US 9,960,711 B2
(45) Date of Patent: May 1, 2018

(54) SINGLE PHASE INVERTERS COOPERATIVELY CONTROLLED TO PROVIDE ONE, TWO, OR THREE PHASE UNIPOLAR ELECTRICITY

(71) Applicant: Zinniatek Limited, Albany (NZ)

(72) Inventors: Sorin Spanoche, Santa Clara, CA (US); Mika Nuotio, San Francisco, CA (US); David Stewart, Tracy, CA (US)

(*) Notice: Subject to any disclaimer, the term of this patent is extended or adjusted under 35 U.S.C. 154(b) by 881 days.

(21) Appl. No.: 14/358,471

(22) PCT Filed: Nov. 20, 2012

(86) PCT No.: PCT/US2012/066118
§ 371 (c)(1),
(2) Date: May 15, 2014

(87) PCT Pub. No.: WO2013/078234
PCT Pub. Date: May 30, 2013

(65) Prior Publication Data
US 2014/0375131 A1    Dec. 25, 2014

Related U.S. Application Data

(60) Provisional application No. 61/562,191, filed on Nov. 21, 2011.

(51) Int. Cl.
*H02J 7/34* (2006.01)
*H02J 1/10* (2006.01)
(Continued)

(52) U.S. Cl.
CPC ......... *H02M 7/5395* (2013.01); *H02M 3/158* (2013.01); *H02M 7/493* (2013.01);
(Continued)

(58) Field of Classification Search
CPC .... H02M 7/5395; H02M 3/158; H02M 7/493; H02M 3/33507; H02J 3/383; Y02E 10/563
See application file for complete search history.

(56) References Cited

U.S. PATENT DOCUMENTS

| 6,088,248 A | 7/2000 | Schenk et al. |
| 2007/0179720 A1* | 8/2007 | Becker ............ H02J 3/383 |
| | | 702/58 |

(Continued)

FOREIGN PATENT DOCUMENTS

| CN | 101064438 A | 10/2007 |
| CN | 101765965 | 6/2010 |

(Continued)

OTHER PUBLICATIONS

Examination Report on New Zealand Application 625048, dated Nov. 5, 2014.

(Continued)

*Primary Examiner* — Rexford Barnie
*Assistant Examiner* — Rasem Mourad
(74) *Attorney, Agent, or Firm* — Foley & Lardner LLP

(57) ABSTRACT

The systems, methods, and devices of the various embodiments provide single phase inverters that may be cooperatively controlled to provide one, two, or three phase unipolar electricity. In an embodiment, a solar panel may be connected to a DC to DC converter and a unipolar power converter. In an embodiment, the unipolar power converter output may be a single phase signal approximating a desired voltage waveform and frequency, offset from the ground electrical potential such that the voltage output signal may be always positive, thus "unipolar". In an embodiment, the unipolar power output of each string of solar panels may be connected to a dedicated, predetermined phase of a load, such as a three phase grid system. In an embodiment, the DC (Continued)

output of a DC to DC converter may be connected in parallel with other DC to DC converters and other unipolar converters.

12 Claims, 14 Drawing Sheets

(51) Int. Cl.
    *H02J 3/38* (2006.01)
    *H02M 7/5395* (2006.01)
    *H02M 3/158* (2006.01)
    *H02M 7/493* (2007.01)
    *H02M 1/00* (2006.01)

(52) U.S. Cl.
    CPC ........ *H02J 3/383* (2013.01); *H02M 2001/007* (2013.01); *Y02E 10/563* (2013.01); *Y10T 307/549* (2015.04)

(56) References Cited

U.S. PATENT DOCUMENTS

| | | | |
|---|---|---|---|
| 2009/0206666 A1 | 8/2009 | Sella et al. | |
| 2010/0038968 A1* | 2/2010 | Ledenev | H02J 3/385 307/82 |
| 2011/0012430 A1* | 1/2011 | Cheng | H01L 31/02021 307/82 |
| 2011/0057515 A1* | 3/2011 | Spanoche | H02M 7/48 307/77 |
| 2011/0075455 A1* | 3/2011 | Sigamani | H02M 7/48 363/71 |
| 2011/0205773 A1* | 8/2011 | Wagoner | H02J 3/383 363/132 |
| 2012/0223584 A1* | 9/2012 | Ledenev | H01L 31/02021 307/82 |

FOREIGN PATENT DOCUMENTS

| | | | |
|---|---|---|---|
| CN | 102124625 | 7/2011 | |
| CN | 201839015 U | 7/2011 | |
| CN | 102163851 A | 8/2011 | |
| EP | 2 284 639 A1 | 2/2011 | |
| EP | 2284639 A1 * | 2/2011 | ............... G05F 1/67 |
| JP | 06-141470 | 5/1994 | |
| JP | 09-294378 | 11/1997 | |
| JP | 2002-369388 | 12/2002 | |
| JP | 2008-507945 | 3/2008 | |
| JP | 2008-277122 | 11/2008 | |
| JP | 2009-232587 | 10/2009 | |
| JP | 2011-097683 | 5/2011 | |
| JP | 2011-193652 | 9/2011 | |
| JP | 05-465051 | 4/2014 | |
| WO | WO-2005/117245 A1 | 12/2005 | |

OTHER PUBLICATIONS

Chinese Office Action dated Sep. 2, 2015, in co-pending application CN 201280057246.1, with English translation (11 pages).
First Examination Report in copending New Zealand Application No. 712076 dated Sep. 25, 2015 (2 pages).
Chinese Office Action dated Nov. 16, 2016, in co-pending application CN 201280057246.1, with English translation (20 pages).
Extended European Search Report dated Nov. 24, 2016 for EP Appl. No. 12850863.7 (20 pages).
International Preliminary Report on Patentability issued on PCT/US2012/066118, dated Jun. 5, 2014.
Office Action for co-pending JP Appl. No. 2014-542576 dated Jul. 19, 2016, with English translation (10 pages).
Supplementary Partial European Search Report dated Jul. 27, 2016 for EP Appl. No. 12850863.7.
International Search Report for PCT/US2012/066118, dated Mar. 29, 2013.
Fifth Office Action issued in CN201280057246.1 dated Feb. 13, 2018, with English translation (12 pages).

* cited by examiner

SINGLE PHASE INVERTERS COOPERATIVELY CONTROLLED TO PROVIDE ONE, TWO, OR THREE PHASE UNIPOLAR ELECTRICITY

RELATED APPLICATIONS

This application is a National Stage Application of PCT/US2012/066118, filed Nov. 20, 2012, which claims the benefit of priority to U.S. Provisional Patent Application 61/562,191 entitled "Single Phase Inverters Cooperatively Controlled to Provide One, Two, or Three Phase Unipolar Electricity" filed Nov. 21, 2011, the entire contents of which are incorporated herein by reference.

FIELD OF THE INVENTION

The present invention relates generally to electrical power conversion, and more specifically to the conversion of direct current (DC) power to alternating current (AC) power.

BACKGROUND

Large power generation systems may provide megawatt class power generation capacity. Various large power generation system configurations may be used, including mirrors for focusing sunlight intensely on a small solar panel or collection of panels. In another large power generation system, there may be many thousands, even millions of photovoltaic panels employed. The panels may be electronically controlled to provide efficient power conversion and safe operation. A variety of apparatus and methods may be used to convert the DC power of a photovoltaic panel into AC power which may be provided to a load. Examples of conversion equipment include microinverters, inverters, and array converters.

As conversion efficiencies have improved, both for sunlight to DC electrical current and DC electrical current to AC power, capital costs have become increasingly important. The cost of installation and materials, for example the connectors and wiring between panels and between a string of panels and a consolidated distribution point, may be significantly increased by power generation systems employing a large number of panels. In some configurations the solar panels may be connected in a series-parallel arrangement, providing a powerful DC signal to a remotely located inverter system. Such a configuration may have several disadvantages. For example, extra wiring and connectors may be required between the solar panels and the inverter system, which may add both material and labor costs, as well as add transmission power losses. Also, an inverter controlling a string of solar panels may operate at a condition that maximizes the power provided by the entire string, which may result in sub-optimizing the power delivered by each individual panel, and therefore the power delivered by the entire string. Microinverters may be connected to each panel and may control a given panel to that panel's maximum power delivery condition, but the use of individual microinverters to provide a three phase electrical output may lead to increased cost and complexity of the microinverters and the power generation system. Single phase inverters may have an increased complexity due to their requirement to provide both positive and negative voltage signals, and may increase the number of switches and other components comprising a power generation system.

SUMMARY

The systems, methods, and devices of the various embodiments provide single phase inverters that may be cooperatively controlled to provide one, two, or three phase unipolar electricity. In the various embodiments, cost of manufacturing and installation may be reduced by the various embodiments while providing efficient power conversion. In an embodiment a solar panel may be connected to a DC to DC converter and a unipolar power converter, and the DC to DC converter may control the solar panel to a maximum power conversion condition. In an embodiment, the unipolar power converter output may be a single phase signal approximating a desired voltage waveform and frequency, offset from the ground electrical potential such that the voltage output signal may be always positive, thus "unipolar". The unipolar power output of each string of solar panels may be connected to a dedicated, predetermined phase of a load, such as a three phase grid system. The DC output of a DC to DC converter may be connected in parallel with other DC to DC converters and other unipolar converters. A unipolar converter may receive DC power from its respective DC to DC converter, or from one or more of the other DC to DC converters electrically connected in parallel.

In an embodiment, the DC and unipolar output of a string of solar panels may be connected to certain input terminals of a combiner enclosure. The combiner enclosure may adjust the voltage of the electrical power to match that of an electrically connected load, for example an electrical grid. The combiner enclosure may also interconnect the DC lines. In the various embodiments the combiner enclosure may include a controller and other means for detecting unsafe conditions, such as electrical arcing or an upstream system failure.

BRIEF DESCRIPTION OF THE DRAWINGS

The accompanying drawings, which are incorporated herein and constitute part of this specification, illustrate exemplary aspects of the invention, and, together with the general description given above and the detailed description given below, serve to explain features of the invention.

DETAILED DESCRIPTION

Figure 1:
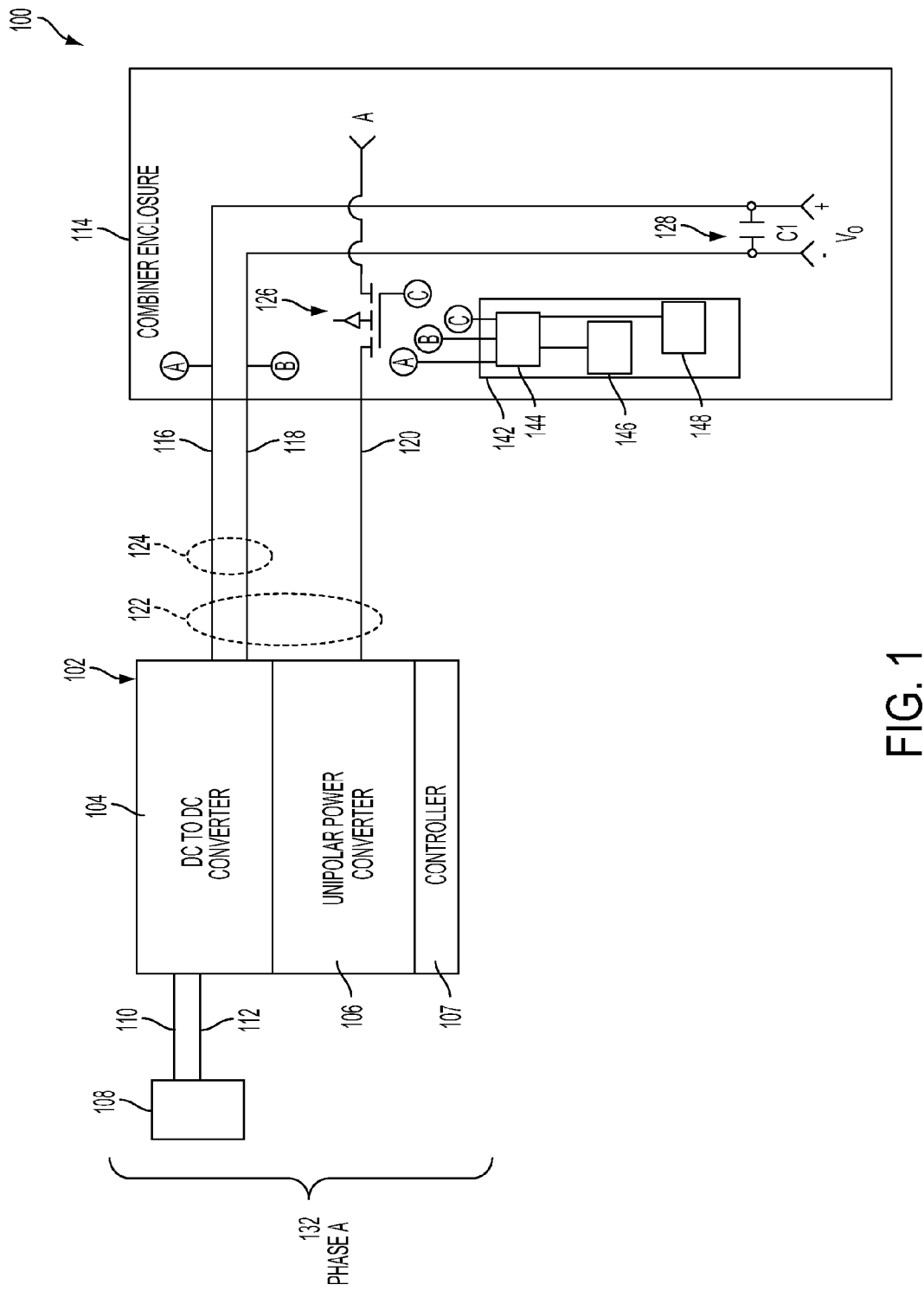
FIG. 1 is a component block diagram of an embodiment power generation system.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The various embodiments are described herein using the example of a photovoltaic or solar panel as a DC input. This example is useful for describing the various components and functionality of the embodiment devices, systems and methods. However, the embodiments and the scope of the claims are not limited to such a configuration unless specifically recited. Describing the embodiments in terms of other potential applications would be unnecessary and repetitive. Thus, the terms "solar panel" or "photovoltaic panel" are used herein to refer generally to any form DC input which the embodiments could be applied, and is not intended to limit the scope of the claims unless specifically recited.

In the industry a symmetrical two phase system may often be referred to as an "Edison" system or a "single phase" system because the two phases are split in a residence power panel and the two phases each distributed as a single phase. For clarity and consistency, herein "single phase" means one phase and "two phase" means an Edison or symmetrical two phase system.

The systems, methods, and devices of the various embodiments provide single phase inverters that may be cooperatively controlled to provide one, two, or three phase unipolar electricity. In the various embodiments, cost of manufacturing and installation may be reduced while providing efficient power conversion. In an embodiment, a solar panel may be connected to a DC to DC converter and a unipolar power converter. The DC to DC converter may control the solar panel to a maximum power conversion condition. The unipolar power converter output may be a single phase signal approximating a desired voltage waveform and frequency, offset from the ground electrical potential such that the voltage output signal may be always positive, thus "unipolar". The unipolar power output of each string of solar panels may be connected to a dedicated, predetermined phase of a load, such as a three phase grid system. The DC output of a DC to DC converter may be connected in parallel with other DC to DC converters and other unipolar converters. A unipolar converter may receive DC power from its respective DC to DC converter, or from one or more of the other DC to DC converters electrically connected in parallel.

In an embodiment, the DC and unipolar output of a string of solar panels may be connected to certain input terminals of a combiner enclosure. The combiner enclosure may adjust the voltage of the electrical power to match that of an electrically connected load, for example an electrical grid. The combiner enclosure may also interconnect the DC lines. In the various embodiments the combiner enclosure may include a controller and other means for detecting unsafe conditions, such as electrical arcing or an upstream system failure.

FIG. 1 illustrates an embodiment single phase power generation system 100. Phase A 132 may be comprised of a power converter unit ("PCU") 102. The PCU 102 may be comprised of a DC to DC converter 104 electrically connected with a unipolar power converter 106 and a controller 107. Additional components of the PCU 102 are discussed below. The PCU 102 may be comprised of one enclosure containing the DC to DC converter 104, the unipolar power converter 106, and the controller 107. In an alternative embodiment, the PCU 102 may comprise a separate enclosure each for the DC to DC converter 104, the unipolar power converter 106, and the controller 107. The DC to DC converter 104 may be connected to a photovoltaic panel ("PV") 108 by lines 110 and 112. In operation, the DC to DC converter 104 may receive positive electrical current on line 110 from the PV 108, and line 112 may act as an electrical return line to complete the circuit between the DC to DC converter 104 and the PV 108 In operation, the DC to DC converter 104 may boost the voltage received from the PV 108 to a DC voltage of a value of at least the peak to peak value of a unipolar voltage expected from the unipolar power converter 106 plus an offset voltage value, for example ten volts (10V) DC. The unipolar power converter 106 may receive a DC signal from the DC to DC converter 104 via an internal connection. The controller 107 may monitor and control the operation of the DC to DC converter 104 and the unipolar power converter 106.

The PCU 102 may be electrically connected to a combiner enclosure 114 by three lines: a positive fixed voltage DC line 116, a negative fixed voltage DC line 118, and a unipolar power line 120. In an embodiment, the three lines 116, 118, and 120 may be encased within an outer sheath 122 and form a single cable that may form a three-wire interconnection from the PCU 102 to the combiner enclosure 114. The DC lines 116 and 118 may provide a positive and a negative DC line referred to herein after as a "link" 124 and the voltage between the two lines 116, 118 as a "Vlink." The controller 107 of the PCU 102 may contain a communication module to inject communication signals into the link 124 or receive communication signals from the link 124. In an alternative embodiment, the communication module may transmit and/or receive communication signals via other communication channels (e.g., via wireless or wired network connections) in addition to, or in place of, communication signals injected into/received from the link 124.

DC lines 116 and 118 may be connected to a capacitor C1 128. The capacitor C1 128 may be a large capacitor or any other energy storage device, such as a bidirectional battery charger. The capacitor C1 128 may absorb transients, for example 120 Hz artifacts, that may occur. The capacitor C1 128 may be a low frequency capacitor of a few hundred microfarads, such as an electrolytic capacitor. Output A may be the output of the unipolar power line 120 which may be a single phase signal approximating a desired voltage waveform and frequency, offset from the ground electrical potential such that the voltage output signal may be always positive, thus "unipolar." Output Vo may be the DC output of DC lines 116 and 118.

A controller 142 within the combiner enclosure 114 may monitor DC lines 116 and 118 via lines A and B, respectively. The controller 142 may contain a programmable controller or processor 144, a memory 146, and a communication module 148. The programmable controller 144 may allow the controller 142 to perform logic operations, perform control operations, perform monitoring operations, and perform communication operations in response to information stored in the memory 146. The lines A, B, and C may be coupled to the programmable controller 144 such that signals from the programmable controller 144 may be sent and/or received via the lines A, B, and C. The controller 142 may control the operation of relay 126 via control line C. As an example, relay 126 may be a single MOSFET, though any known type of technology capable of performing a switching function, including relays, transistors, bi-polar transistors, insulated-gate bipolar transistors (IGBTs), silicon carbide or gallium nitride transistors, thyristors, series connected MOSFETs, thyristor emulators, and diodes in series with IGBTs may be used. The controller 142 may contain a communication module 148 coupled to the programmable controller 144 to inject communication signals into the link 124 or receive communication signals from the link 124 via lines A or B. In this manner, controller 107 of the PCU 102 may communicate with the controller 142 of the combiner enclosure 114. Communication between the controllers 107 and 142 may include reporting power provided, PV 108 voltage or current, status of the unipolar power converter 106, and receiving commands to enable or disable the unipolar power converter 106. In an alternative embodiment, the communication module 148 may transmit and/or receive communication signals via other communication channels (e.g., via wireless or wired network connections) in addition to, or in place of, communication signals injected into/received from the link 124.

The controller 142 may have anti-islanding capabilities and may detect arc faults on the link 124 by monitoring line A and/or B. In operation, if an arc fault is detected on the link 124, the unipolar power line 120 may be disconnected by opening the relay 126. The controller 107 in the PCU 102 may detect the disconnection of the unipolar power line 120, and may stop the DC to DC converter 104, and may disconnect the PCU 102 from the link 124. The controller 142 within the combiner enclosure 114 may discharge the link 124. In some embodiments, restart may be allowed only upon human inspection and intervention. Having a centralized, possibly redundant, arc fault detection and anti-islanding may lower the overall cost per unit and increase the overall safety of the single phase power generation system 100.

Figure 2:
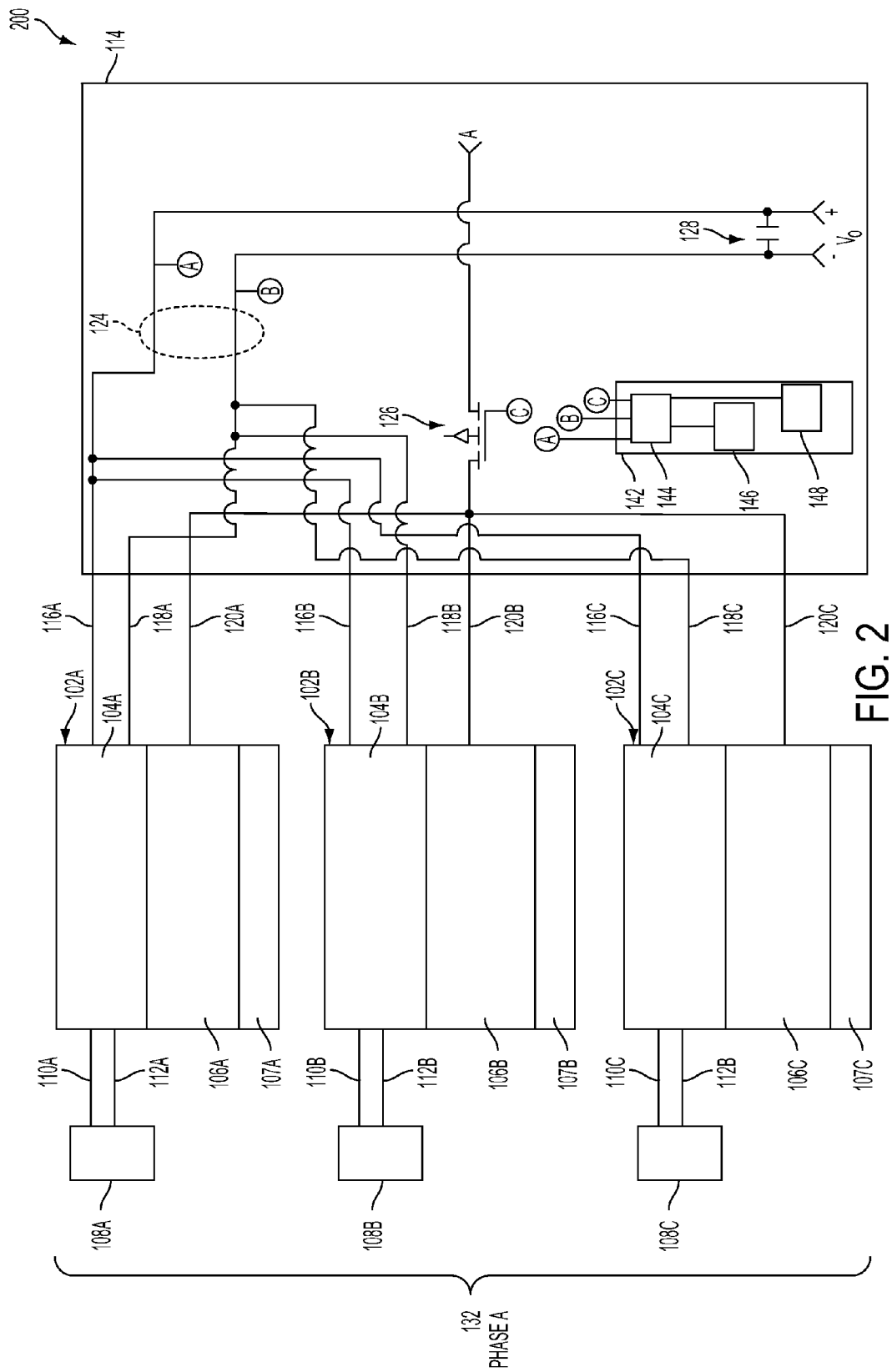
FIG. 2 is a component block diagram of another embodiment power generation system.

FIG. 2 illustrates an embodiment single phase power generation system 200 similar to the single phase power generation system 100 illustrated in FIG. 1 with the addition of multiple PVs 108A, 108B, and 108C and multiple PCUs 102A, 102B, and 102C. Phase A 132 of single phase power generation system 200 may comprise a set of PVs such as 108A, 108B, and 108C and PCUs 102A, 102B, and 102C. While discussed in relation to three PVs 108A, 108B, and 108C and three PCUs 102A, 102B, and 102C, the power generation system 200 need not be limited to three PV and PCU pairs, and for additional power capacity, an unlimited number of PV plus PCU sets may be added. Each PCU 102A, 102B, and 102C may be similar to the PCU 102 discussed above with reference to FIG. 1. Each PCU 102A, 102B, and 102C may comprise a DC to DC converter 104A, 104B, and 104C, a unipolar power converter 106A, 106B, and 106C, and a controller 107A, 107B, and 107C, respectively. Each PV 108A, 108B, and 108C, may be connected to the DC to DC converter 104A, 104B, or 104C of its respective PCU 102A, 102B or 102C by lines 110A, 110B, 110C, 112A, 112B, and 112C, respectively.

Each PCU 102A, 102B, and 102C may be electrically connected to a combiner enclosure 114 by three lines: a positive fixed voltage DC line 116A, 116B, and 116C, a negative fixed voltage DC line 118A, 118B, and 118C, and a unipolar power line 120A, 120B, and 120C. All common lines may be electrically connected inside the combiner enclosure 114. Each positive fixed voltage DC line 116A, 116B, and 116C may be connected in parallel together. Each negative fixed voltage DC line 118A, 118B, and 118C may be connected in parallel together. In this manner all positive fixed voltage DC lines 116A, 116B, and 116C connected in parallel and all negative fixed voltage DC lines 118A, 118B, and 118C may form the link 124. The controllers 107A, 107B, and 107C of each PCU 102A, 102B, and 102C may contain a communication module to inject communication signals into the link 124 or receive communication signals from the link 124.

In an alternative embodiment, only one PCU 102A of the string of PCUs 102A, 102B, and 102C may be physically connected to the combiner enclosure 114. The combiner enclosure 114 may be a single unit. However, it may be desirable or required by code or regulation to keep the DC (116A, 116B, 116C, 118A, 118B, and 118C) and unipolar power lines (120A, 120B, and 120C) separate. In an alternative embodiment, the DC lines 116A, 116B, 116C, 118A, 118B, and 118C may go into one enclosure and the unipolar power lines 120A, 120B, and 120C into another enclosure. In an embodiment, the number of PCUs in parallel may be limited, for example not to exceed fifteen PCUs in parallel due to wire limitations, and additional plant-level power capacity may be added by another set of PVs plus PCUs connected in parallel to the combiner enclosure 114. In another embodiment, various subset collections of the plant's DC lines may be separated to avoid a single-point failure, such that substantially the same number of modules may be electrically connected in each phase in a single group of DC lines and each pair of DC lines may be connected to a separate storage device.

As discussed above with reference to FIG. 1, the link 124 may be connected to a capacitor C1 128. The capacitor C1 128 may be a large capacitor or any other energy storage device, such as a bidirectional battery charger. The capacitor C1 128 may absorb transients, for example 120 Hz artifacts, that may occur. The capacitor C1 128 may be a low frequency capacitor of a few hundred microfarads, such as an electrolytic capacitor. Output A may be the output of the unipolar power lines 120A, 120B, and 120C connected in parallel, which may be a single phase signal approximating a desired voltage waveform and frequency, offset from the ground electrical potential such that the voltage output signal may be always positive, thus "unipolar." Output Vo may be the DC output of the link 124.

A controller 142 within the combiner enclosure 114 may monitor the link 124 via lines A and B, respectively. Controller 142 may contain a programmable controller or processor 144, a memory 146, and a communication module 148. The programmable controller 144 may allow the controller 142 to perform logic operations, perform control the operations, perform monitoring operations, and perform communication operations in response to information stored in the memory 146. The lines A, B, and C may be coupled to the programmable controller 144 such that signals from the programmable controller 144 may be sent or received via the lines A, B, and C. The controller 142 may control the operation of relay 126 via control line C. As an example, relay 126 may be a single MOSFET, though any known type of technology capable of performing a switching function, including relays, transistors, bi-polar transistors, insulated-gate bipolar transistors (IGBTs), silicon carbide or gallium nitride transistors, thyristors, series connected MOSFETs, thyristor emulators, and diodes in series with IGBTs may be used. The controller 142 may contain a communication module 148 coupled to the programmable controller 144 to inject communication signals into the link 124 or receive communication signals from the link 124 via lines A or B. In this manner, controllers 107A, 107B, and 107C of the PCUs 102A, 102B, and 102C may communicate with the controller 142 of the combiner enclosure 114 and with each other. Communication between the controllers 107A, 107B, 107C, and 142 may include reporting power provided, PV 108A, 108B, and/or 108C voltage or current, status of the unipolar power converters 106A, 106B, and/or 106C, and receiving commands to enable or disable the unipolar power converters 106A, 106B, and/or 106C.

The controller 142 may have anti-islanding capabilities and may detect arc faults on the link 124 by monitoring line A and/or B. In operation, if an arc fault is detected on the link 124, the unipolar power lines 120A, 120B, and 120C may be disconnected by opening the relay 126. The controllers 107A, 107B, and/or 107C in the PCUs 102A, 102B, and/or 102C may detect the disconnection of the unipolar power lines 120A, 120B, and/or 120C, and may stop the DC to DC converters 104A, 104B, and/or 104C, and may disconnect the PCUs 102A, 102B, and/or 102C from the link 124. The controller 142 within the combiner enclosure 114 may discharge the link 124. In some embodiments restart may be allowed only upon human inspection and intervention. Having a centralized, possibly redundant, arc fault detection and anti-islanding may lower the overall cost per unit and increase the overall safety of the single phase power generation system 200.

Figure 3A:
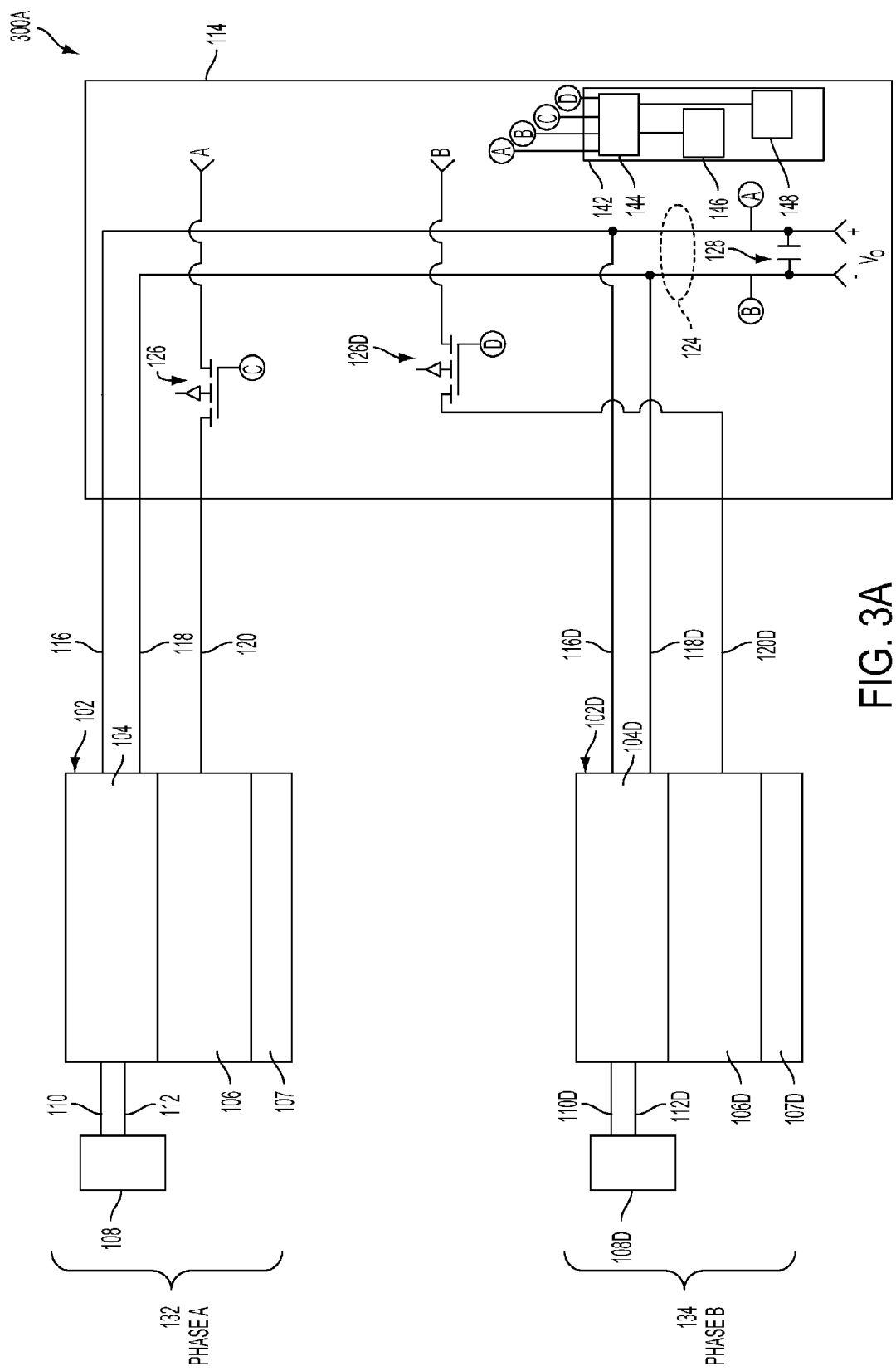
FIG. 3A is a component block diagram of a third embodiment power generation system.

FIG. 3A illustrates a two phase power generation system 300A comprised of Phase A 132 discussed above with reference to FIG. 1, combined with another PV 108D and PCU 102D set, herein denominated Phase B 134. Phase B 134 may be comprised of a PV 108D connected to the PCU 102D by lines 110D and 112D. PCU 102D may be comprised of a DC to DC converter 104D, a unipolar power converter 106D, and a controller 107D. The PV 108D and PCU 102D of Phase B 134 may operate in a manner similar to that of Phase A 132 discussed above with reference to FIG. 1.

Each PCU 102 and 102D may be electrically connected to a combiner enclosure 114 by three lines: a positive fixed voltage DC line 116 and 116B, a negative fixed voltage DC line 118 and 118B, and a unipolar power line 120 and 120D. The positive fixed voltage DC lines 116 and 116D may be connected together. Each negative fixed voltage DC line 118 and 118D may be connected together. In this manner all positive fixed voltage DC lines 116 and 116D connected together and all negative fixed voltage DC lines 118 and 118D connected together may form the link 124. The controllers 107 and 107D of each PCU 102 and 102D may contain a communication module to inject communication signals into the link 124 or receive communication signals from the link 124.

As discussed above with reference to FIG. 1, the link 124 may be connected to a capacitor C1 128. The capacitor C1 128 may be a large capacitor or any other energy storage device, such as a bidirectional battery charger. The capacitor C1 128 may absorb transients, for example 120 Hz artifacts, that may occur. The capacitor C1 128 may be a low frequency capacitor of a few hundred microfarads, such as an electrolytic capacitor.

Output A may be the output of the unipolar power line 120, which may be a single phase signal approximating a desired voltage waveform and frequency, offset from the ground electrical potential such that the voltage output signal may be always positive, thus "unipolar." Output B may be the output of the unipolar power line 120D, which may be a single phase signal approximating a desired voltage waveform and frequency, offset from the ground electrical potential such that the voltage output signal may be always positive, thus "unipolar." Output Vo may be the DC output of the link 124.

A controller 142 within the combiner enclosure 114 may monitor the link 124 via lines A and B, as discussed above with reference to FIG. 1. Controller 142 may contain a programmable controller or processor 144, a memory 146, and a communication module 148. The programmable controller 144 may allow the controller 142 to perform logic operations, perform control the operations, perform monitoring operations, and perform communication operations in response to information stored in the memory 146. The lines A, B, C, and D may be coupled to the programmable controller 144 such that signals from the programmable controller 144 may be sent or received via the lines A, B, C, and D. The controller 142 may control the operation of relay 126 via control line C and the operation of relay 126D via control line D. As an example, relays 126 and 126D may be a single MOSFET, though any known type of technology capable of performing a switching function, including relays, transistors, bi-polar transistors, insulated-gate bipolar transistors (IGBTs), silicon carbide or gallium nitride transistors, thyristors, series connected MOSFETs, thyristor emulators, and diodes in series with IGBTs may be used. The controller 142 may contain a communication module 148 coupled to the programmable controller 144 to inject communication signals into the link 124 or receive communication signals from the link 124 via lines A or B. In this manner, controllers 107 and 107D of the PCUs 102 and 102D may communicate with the controller 142 of the combiner enclosure 114 and with each other. Communication between the controllers 107, 107D, and 142 may include reporting power provided, PV 108 and/or 108D voltage or current, status of the unipolar power converters 106 and/or 106D, and receiving commands to enable or disable the unipolar power converters 106 and/or 106D.

The controller 142 may have anti-islanding capabilities and may detect arc faults on the link 124 by monitoring line A and/or B. In operation, if an arc fault is detected on the link 124, the unipolar power lines 120 and/or 120D may be disconnected by opening the relay 126 and/or relay 126D. The controller 107 in the PCU 102 may detect the disconnection of the unipolar power line 120, and may stop the DC to DC converter 104, and may disconnect the PCU 102 from the link 124. The controller 107D in the PCU 102D may detect the disconnection of the unipolar power line 120D, and may stop the DC to DC converter 104D, and may disconnect the PCU 102D from the link 124. The controller 142 within the combiner enclosure 114 may discharge the link 124. In some embodiments restart may be allowed only upon human inspection and intervention. Having a centralized, possibly redundant, arc fault detection and anti-islanding may lower the overall cost per unit and increase the overall safety of the single phase power generation system 300.

Figure 3B:
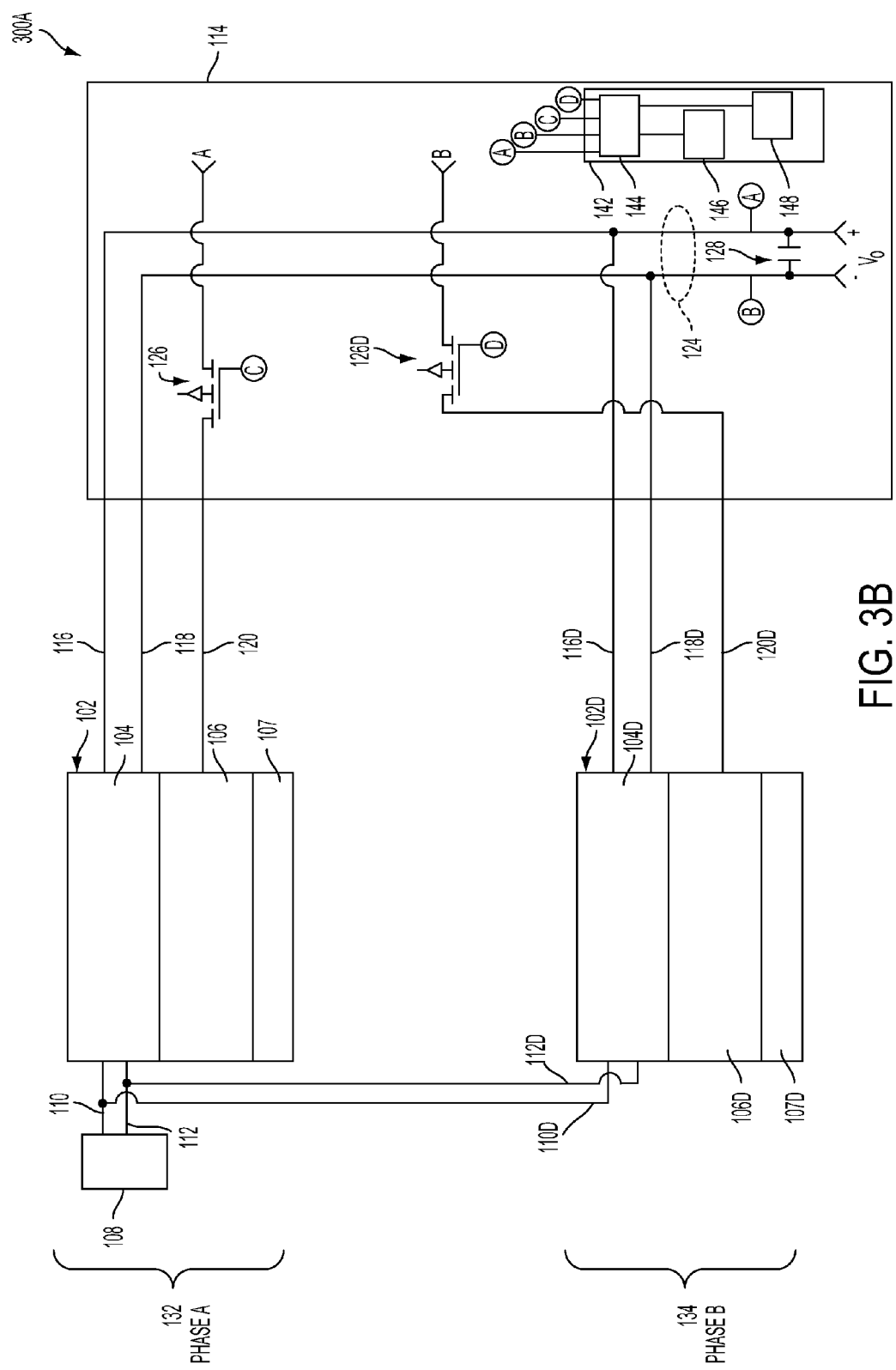
FIG. 3B is a component block diagram of a fourth embodiment power generation system.

FIG. 3B illustrates a two phase power generation system 300B similar to two phase power generation system 300A discussed above with reference to FIG. 3A, except that rather than two PVs 108 and 108D each connected to a PCU 102 and 102D, respectively, a single PV 108 is associated with electronics interfaces for the two phases, Phase A 132 and Phase B 134. In the two phase power generation system 300B, Phase A 132 may be comprised of PV 108 connected to the PCU 102 by lines 110 and 112 and Phase B 134 may be comprised of PV 108 connected to the PCU 102D by lines 110D and 112D. The two phase power generation system 300B may operate in a manner similar to two phase power generation system 300A discussed above with reference to FIG. 3A.

Figure 4A:
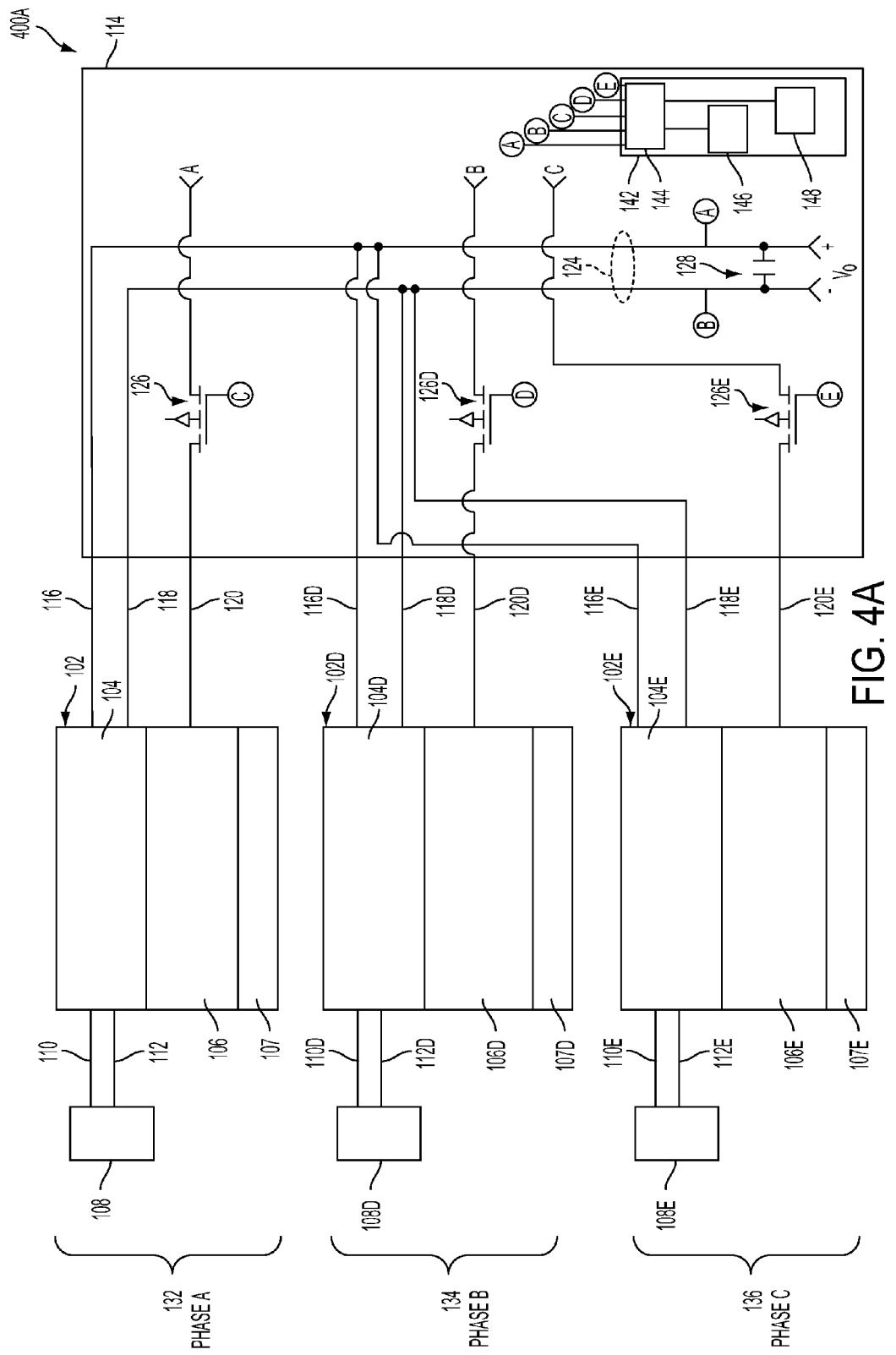
FIG. 4A is a component block diagram of a fifth embodiment power generation system.

FIG. 4A illustrates a three phase power generation system 400A that may be comprised of Phase A 132 and Phase B 134 discussed above with reference to FIG. 3A, combined with another PV 108E and PCU 102E set, herein denominated Phase C 136. Phase C 136 may be comprised of a PV 108E connected to the PCU 102E by lines 110E and 112E. PCU 102E may be comprised of a DC to DC converter 104E, a unipolar power converter 106E, and a controller 107E. The PV 108E and PCU 102E of Phase C 134 may operate in a manner similar to that of Phase A 132 and Phase B 134 discussed above with reference to FIG. 3A.

Each PCU 102, 102D, and 102E may be electrically connected to a combiner enclosure 114 by three lines: a positive fixed voltage DC line 116, 116D, and 116E, a negative fixed voltage DC line 118, 118D, and 118E, and a unipolar power line 120, 120D, and 120E. The positive fixed voltage DC lines 116, 116D, and 116E may be connected together in parallel. Each negative fixed voltage DC line 118, 118D, and 118E may be connected together in parallel. In this manner all positive fixed voltage DC lines 116, 116D, 116E connected together and all negative fixed voltage DC lines 118, 118D, and 118E connected together may form the link 124. The controllers 107, 107D, and 107E of each PCU 102, 102D, and 102E may contain a communication module to inject communication signals into the link 124 or receive communication signals from the link 124.

As discussed above with reference to FIG. 1, the link 124 may be connected to a capacitor C1 128. The capacitor C1 128 may be a large capacitor or any other energy storage device, such as a bidirectional battery charger. The capacitor C1 128 may absorb transients, for example 120 Hz artifacts, that may occur. The capacitor C1 128 may be a low frequency capacitor of a few hundred microfarads, such as an electrolytic capacitor.

Output A may be the output of the unipolar power line 120, which may be a single phase signal approximating a desired voltage waveform and frequency, offset from the ground electrical potential such that the voltage output signal may be always positive, thus "unipolar." Output B may be the output of the unipolar power line 120D, which may be a single phase signal approximating a desired voltage waveform and frequency, offset from the ground electrical potential such that the voltage output signal may be always positive, thus "unipolar." Output C may be the output of the unipolar power line 120E, which may be a single phase signal approximating a desired voltage waveform and frequency, offset from the ground electrical potential such that the voltage output signal may be always positive, thus "unipolar." Output Vo may be the DC output of the link 124.

A controller 142 within the combiner enclosure 114 may monitor the link 124 via lines A and B, as discussed above with reference to FIG. 1. The controller 142 may contain a programmable controller or processor 144, a memory 146, and a communication module 148. The programmable controller 144 may allow the controller 142 to perform logic operations, perform control the operations, perform monitoring operations, and perform communication operations in response to information stored in the memory 146. The lines A, B, C, D, and E may be coupled to the programmable controller 144 such that signals from the programmable controller 144 may be sent or received via the lines A, B, C, D, and E. The controller 142 may control the operation of relay 126 via control line C, the operation of relay 126D via control line D, and the operation of relay 126E via control line E. As an example, relays 126, 126D, and 126E may be a single MOSFET, though any known type of technology capable of performing a switching function, including relays, transistors, bi-polar transistors, insulated-gate bipolar transistors (IGBTs), silicon carbide or gallium nitride transistors, thyristors, series connected MOSFETs, thyristor emulators, and diodes in series with IGBTs may be used. The controller 142 may contain a communication module 148 coupled to the programmable controller 144 to inject communication signals into the link 124 or receive communication signals from the link 124 via lines A or B. In this manner, controllers 107, 107D, and 107E of the PCUs 102, 102D, and 102E may communicate with the controller 142 of the combiner enclosure 114 and with each other. Communication between the controllers 107, 107D, 107E, and 142 may include reporting power provided, PV 108, 108D, and/or 108E voltage or current, status of the unipolar power converters 106, 106D, and/or 106E, and receiving commands to enable or disable the unipolar power converters 106, 106D, and/or 106E.

The controller 142 may have anti-islanding capabilities and may detect arc faults on the link 124 by monitoring line A and/or B. In operation, if an arc fault is detected on the link 124, the unipolar power lines 120, 120D, and/or 120E may be disconnected by opening the relay 126, 126D, and/or relay 126E. The controller 107 in the PCU 102 may detect the disconnection of the unipolar power line 120, and may stop the DC to DC converter 104, and may disconnect the PCU 102 from the link 124. The controller 107D in the PCU 102D may detect the disconnection of the unipolar power line 120D, and may stop the DC to DC converter 104D, and may disconnect the PCU 102D from the link 124. The controller 107E in the PCU 102E may detect the disconnection of the unipolar power line 120E, and may stop the DC to DC converter 104E, and may disconnect the PCU 102E from the link 124. The controller 142 within the combiner enclosure 114 may discharge the link 124. In some embodiments restart may be allowed only upon human inspection and intervention. Having a centralized, possibly redundant, arc fault detection and anti-islanding may lower the overall cost per unit and increase the overall safety of the single phase power generation system 400.

The output of DC-DC converters 104, 104D, and 104E may be electrically connected in parallel and may function to set a target voltage to regulate their respective PVs, 108, 108D, and 108E as the DC-DC converter input voltage. As a result each DC-DC converter 104, 104D, and 104E may operate at constant power if its respective PV 108, 108D, and 108E insolation and temperature conditions do not change. The output of the DC-DC converters 104, 104D, and 104E provide the input power to the unipolar power converters 106, 106D, and 106E. If, for any reason, there may be more input power to the unipolar power converters 106, 106D, and 106E than may be desirable to deliver on the outputs (for instance safety limit for output FETs or plant level limitation), then all associated DC-DC converters 104, 104D, and 104E may limit their output power. In an embodiment this may be done by controlling the DC-DC converters 104, 104D, and 104E so as to limit the link 124 voltage Vlink to a value corresponding to the maximum power needed from the plant.

A three phase output may be output from the combiner enclosure 114. The minimum voltage may be offset by a voltage value Voffset, above the negative voltage at lines 112, 112D, 112E, 118, 118D, and 118E. In some embodiments Voffset may be ten volts. A neutral voltage point may be connected to the corresponding neutral line of a grid system. Likewise Phase A terminal, Phase B, and Phase C output from combiner enclosure 114 may be connected to corresponding phase lines of the grid.

Figure 4B:
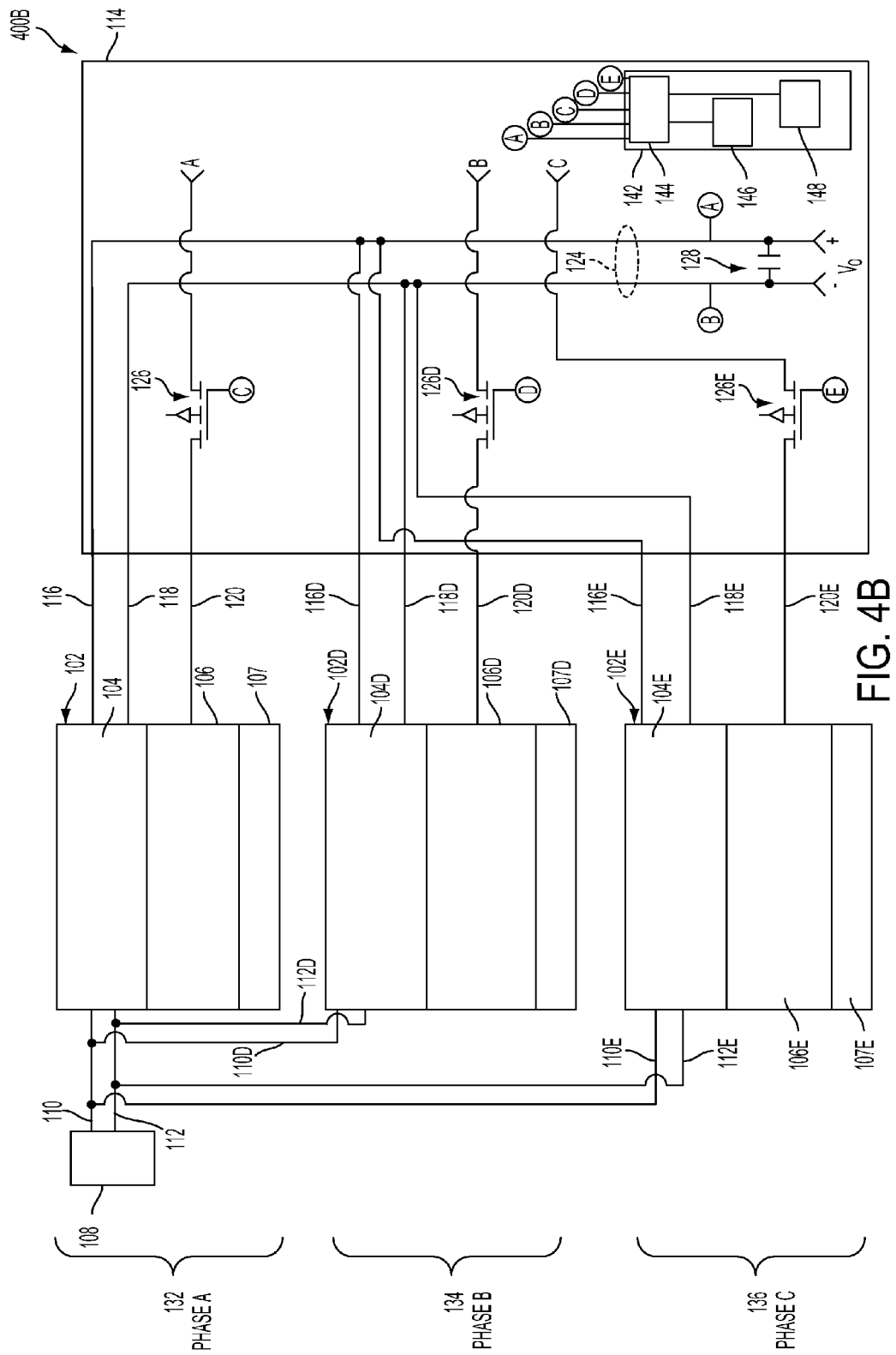
FIG. 4B is a component block diagram of a sixth embodiment power generation system.

FIG. 4B illustrates a three phase power generation system 400B similar to three phase power generation system 400A discussed above with reference to FIG. 4A, except that rather than three PVs 108, 108D, and 108E each connected to a PCU 102, 102D, and 102E, respectively, a single PV 108 is associated with electronics interfaces for the three phases, Phase A 132, Phase B 134, and Phase C 136. In the three phase power generation system 400B, Phase A 132 may be comprised of PV 108 connected to the PCU 102 by lines 110 and 112, Phase B 134 may be comprised of PV 108 connected to the PCU 102D by lines 110D and 112D, and Phase C 136 may be comprised of PV 108 connected to the PCU 102E by lines 110E and 112E. The three phase power generation system 400B may operate in a manner similar to three phase power generation system 400A discussed above with reference to FIG. 4A.

Figure 5:
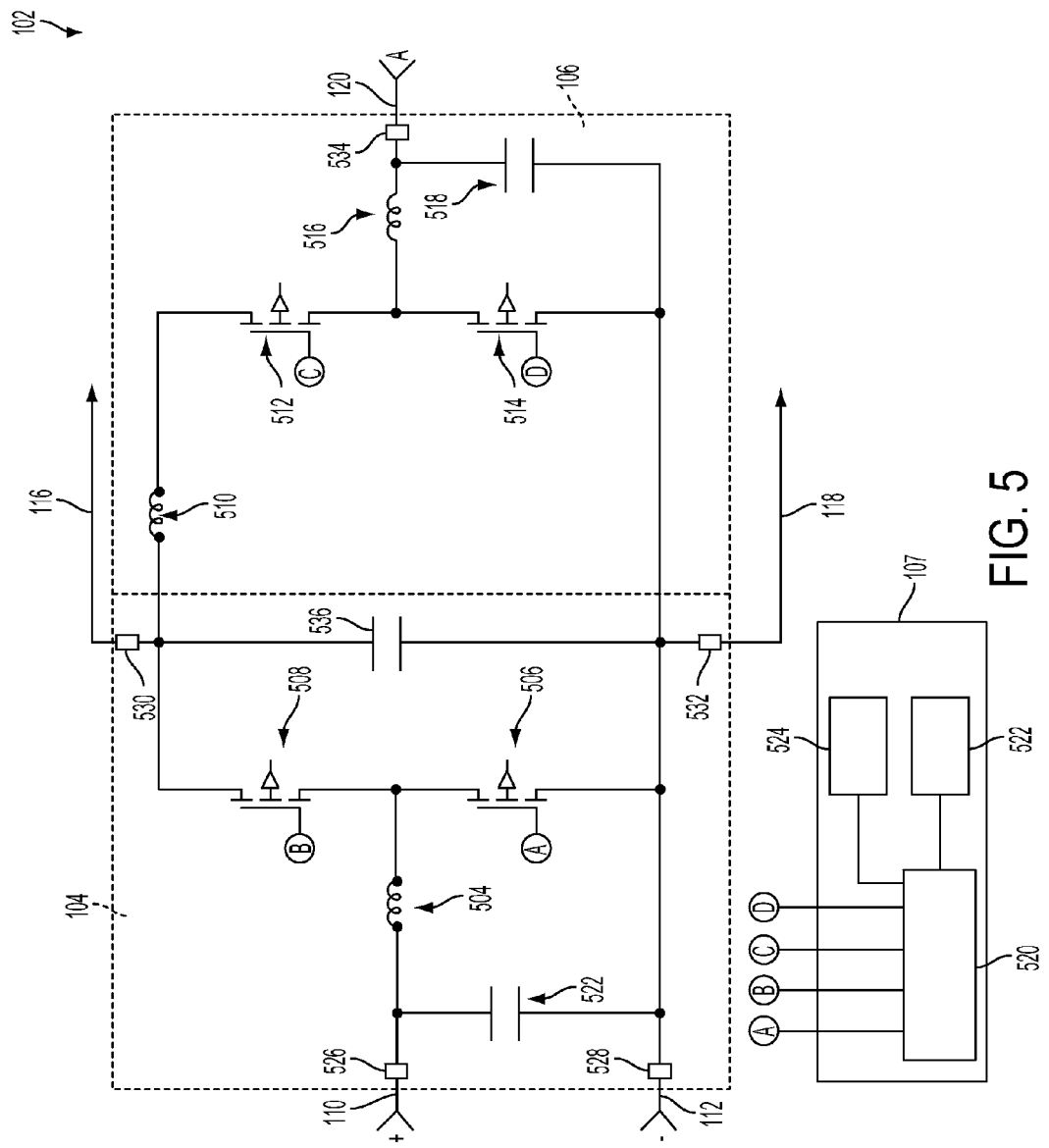
FIG. 5 is circuit diagram of an embodiment power converter unit.

FIG. 5 illustrates the components of an embodiment PCU 102 as discussed above with reference to FIG. 1. Capacitors 502 and 536, a coil 504, and switches 506 and 508 may form the boost-type DC to DC converter 104. Line 110 may be connected to a positive input terminal 526 of the DC to DC converter 104 and line 112 may be connected to a negative input terminal 528 of the DC to DC converter 104. An input terminal of the capacitor 502 and an input terminal of the coil 504 may be connected to the positive input terminal 526. An output terminal of the coil 504 may be connected to an input terminal of switch 508 and an input terminal of switch 506. Switches 506 and 508 may be single MOSFETs, though any known type of technology capable of performing a switching function, including relays, transistors, bi-polar transistors, insulated-gate bipolar transistors (IGBTs), silicon carbide or gallium nitride transistors, thyristors, series connected MOSFETs, thyristor emulators, and diodes in series with IGBTs may be used. Additionally, switches 506 and 508 may be different types of switches. In an alternative embodiment, switch 506 may be a diode though this example configuration may result in a lower component cost it may also result in some sacrifice in efficiency.

An output terminal of switch 508 may be connected to an input terminal of capacitor 536 and to positive DC output terminal 530. Positive DC output terminal 530 may be connected to positive fixed voltage DC line 116. The capacitor 536 may be a high frequency capacitor, for example a few microfarad capacitor and may filter high frequency switching artifacts. The output terminal of capacitor 502, output terminal of switch 506, and the output terminal of capacitor 536 may be connected to the negative input terminal 528. Additionally, the output terminal of capacitor 502, output terminal of switch 506, the output terminal of capacitor 536, and the negative input terminal 528 may be connected to negative DC output terminal 532. The negative DC output terminal 532 may be connected to negative fixed voltage DC line 118.

Coils 510 and 516, switches 512 and 514, and a capacitor 518 may form the unipolar power converter 106. An input terminal of coil 510 may be connected to the input terminal of capacitor 536, the output terminal of switch 508, and the positive DC output terminal 530. An output terminal of coil 510 may be connected to an input terminal of switch 512. Switch 512 may be a single MOSFET, though any known type of technology capable of performing a switching function, including relays, transistors, bi-polar transistors, insulated-gate bipolar transistors (IGBTs), silicon carbide or gallium nitride transistors, thyristors, series connected MOSFETs, thyristor emulators, and diodes in series with IGBTs may be used. An output terminal of switch 512 may be connected to an input terminal of coil 516 and an output terminal of switch 514. Switch 514 may be a single MOSFET, though any known type of technology capable of performing a switching function, including relays, transistors, bi-polar transistors, insulated-gate bipolar transistors (IGBTs), silicon carbide or gallium nitride transistors, thyristors, series connected MOSFETs, thyristor emulators, and diodes in series with IGBTs may be used. In an alternative embodiment, switch 514 may be a diode. An output terminal of switch 512 and an output terminal of switch 514 may be connected together to form a single output terminal. Connected together in this manner, switch 512 and 514 may form a half bridge circuit. The output terminal of switch 512 and output terminal of switch 514 may be connected together to form a single output terminal which may be connected to an input terminal of coil 516.

An output terminal of coil 516 may be connected to an input terminal of capacitor 518 and to unipolar power output terminal 534. Unipolar power output terminal 534 may be connected to unipolar power line 120. An output terminal of capacitor 518 may be connected to an input terminal of switch 514, the output terminal of capacitor 502, the output terminal of switch 506, the output terminal of capacitor 536, the negative input terminal 528, and to negative DC output terminal 532. Capacitor 518 may enable high frequency decoupling of the unipolar power converter 106 from a power system to which the unipolar power converter 106 may be coupled.

The controller 107 may provide control signals to the control gates of switches 506, 508, 512, and 514 via control lines A, B, C, and D, respectively. The controller 107 may comprise a plurality of output terminals, each of which may be operated independently. Control lines A, B, C, and D may be connected to the control gates of switches 506, 508, 512, and 514, respectively. Controller 107 may contain a programmable controller or processor 520, a memory 522, and a communication module 524. The programmable controller 520 may perform logic operations, perform control operations, perform monitoring operations, and perform communication operations in response to information stored in the memory 522. The lines A, B, C, and D may be coupled to the programmable controller 520 such that signals from the programmable controller 520 may be sent or received via the lines A, B, C, and D. The lines A, B, C, and D may be coupled to the programmable controller 520 such that signals from the programmable controller 520 control the operation of switches 506, 508, 512, and 514, respectively. In an embodiment, the programmable controller 520 may control the operation of switches 506 and 508 such that the DC to DC converter 104 has a high switching frequency, for example 30 KHz. Communication module 524 may enable the programmable controller 520 to send and receive information via lines connected to the positive DC output terminal 530, the negative DC output terminal 532, and the unipolar power output terminal 534, and/or via other communication channels (e.g., via wireless or wired network connections).

Figure 6:
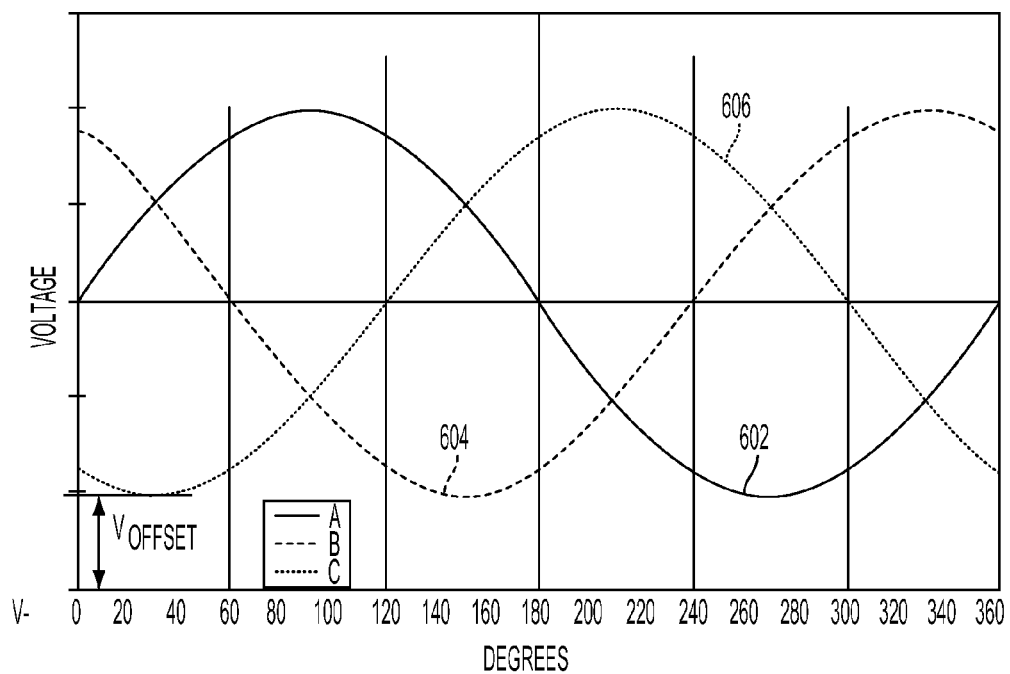
FIG. 6 is a graph of a three phase power output.
Figure 7:
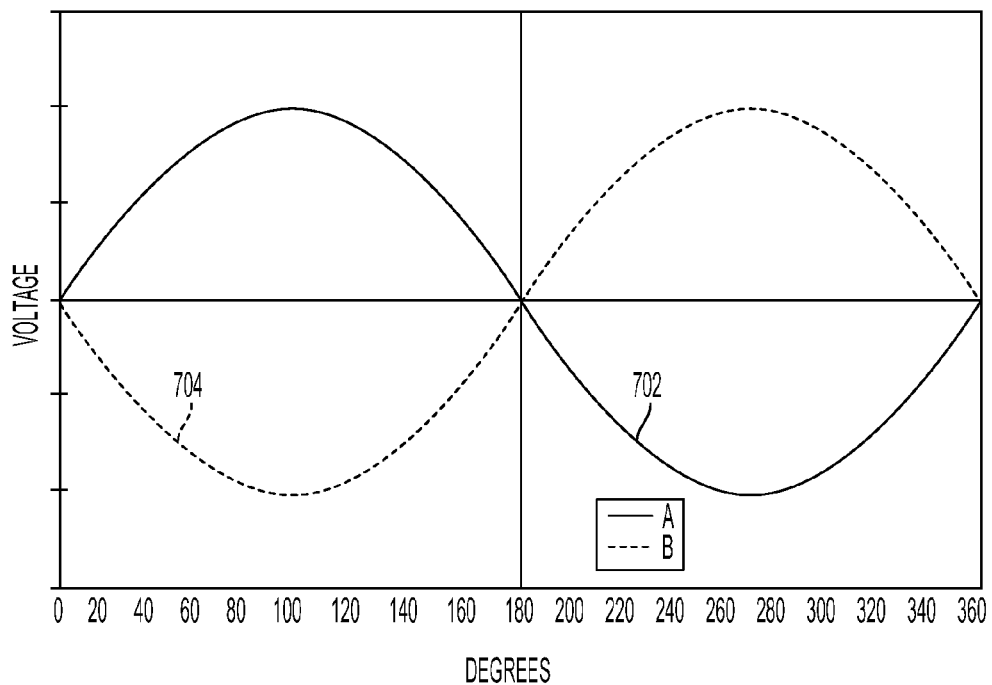
FIG. 7 is a graph of a two phase power output.

FIG. 6 illustrates the phase relationships between the three phases A 602, B 604, and C 606. FIG. 7 illustrates the phase relationship for a two phase system, for example 180 degrees, between two phases A 702 and B 704.

Figure 8:
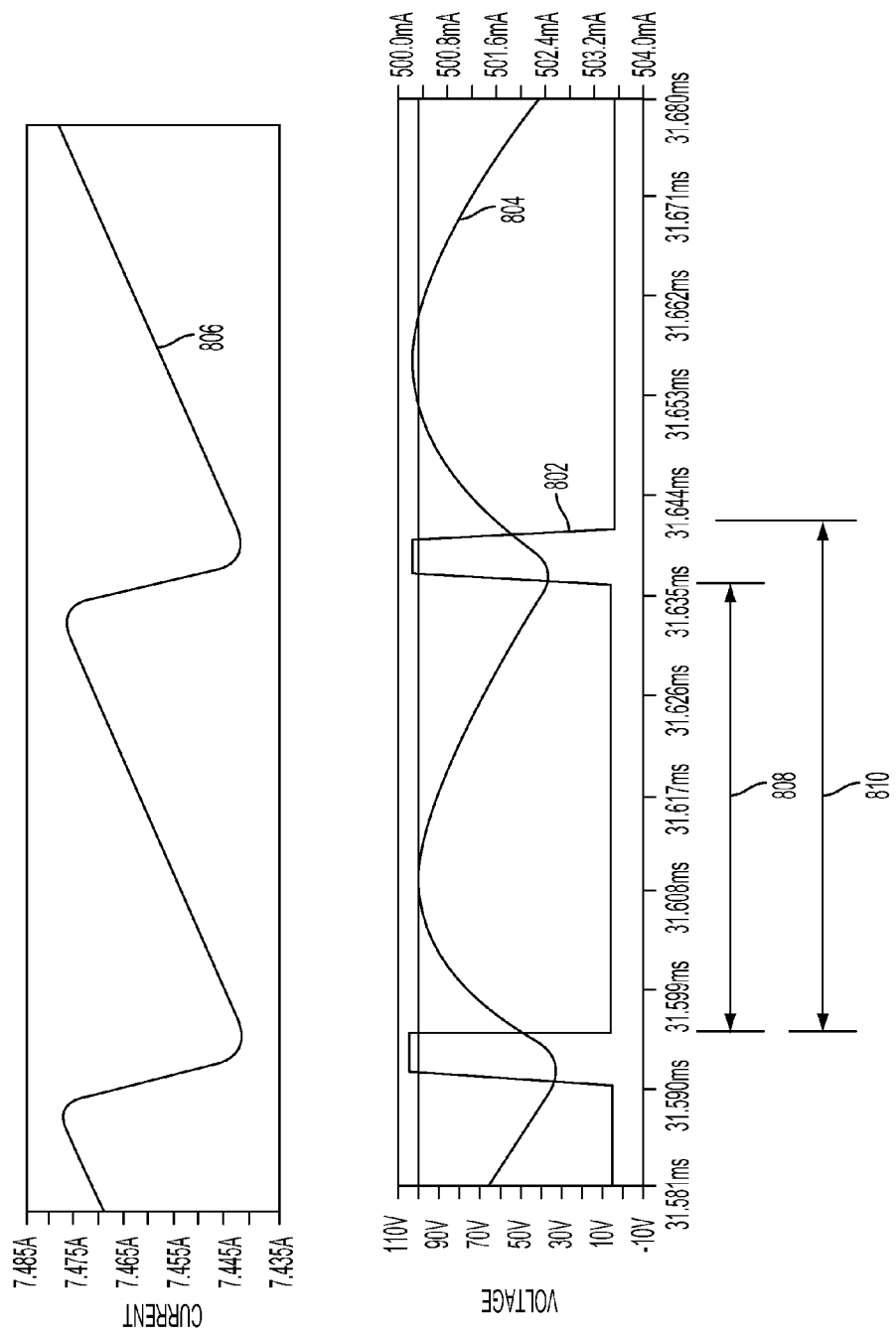
FIG. 8 is a graph relating time, voltage, current, and switching periods.

FIG. 8 illustrates an example of the result of the conversion of a pulse width modulated pulse which may be translated into a pulse amplitude modulated (PAM) current pulse by the PCU 102 as discussed above with reference to FIG. 5. The short duration roughly rectangular voltage pulses 802 may represent the voltage on the drain side of switch 506. The pulse width 808 may approximate the pulse width of the signal from the controller 107 via line A and the period 810 may be the switching period of the PCU 102. The rounded half wave rectified sine wave 804 may be the output of the PCU 102 at unipolar power output terminal 534 to line A, depending on the status of the control signals from controller 107 and the status of the switches 512 and 514. The capacitor 536 may act with the coils 510 and 516 and capacitor 518 as a reconstruction filter to create the rounded half wave rectified sine wave 804. The triangle waveform 806 illustrates the variation of the current which may occur through a PV 108 connected to the PCU 102 during the same time period, and shows the effect the coil 504 and capacitor 536 may have in maintaining a relatively constant PV 108 current, independent of the relatively large pulse width modulated current pulses created by the reconstruction filter.

Figure 9:
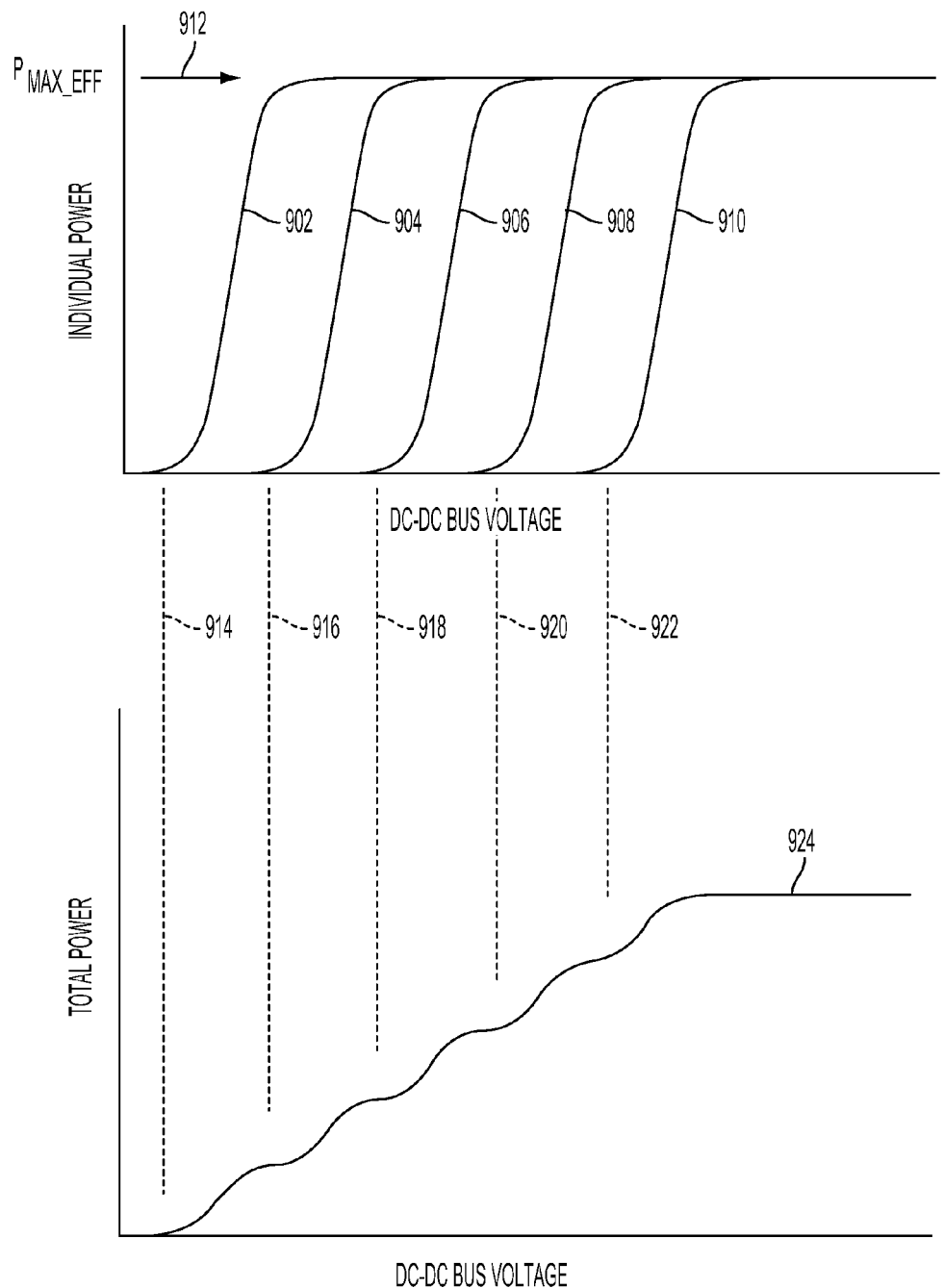
FIG. 9 is a graph relating individual power and total power outputs over time.

FIG. 9 illustrates the relationship between the individual power curves of a group of five PCUs connected in parallel in a single phase power generation system and the total power curve of the five PCU single phase power generation system for a given period of time. While discussed in terms of a five PCU single phase power generation system, an unlimited number of PCU's may be connected in parallel. As discussed above, a PV may be connected to a PCU, and an unlimited number of PCUs may be connected in parallel, such that the outputs of each PCU may be joined in parallel to comprise a single phase of power. As solar light begins to be incident upon the PVs, the power available from each PV may be less than that PV's maximum power. During a low power condition (such as during the morning sunrise), each unipolar power converter of the group of five PCU's may operate at an inefficient condition if all unipolar power converters were placed in operation at once. To improve efficiency, at a first period of time, from time 914 to 916, a first PCU's unipolar power converter may be activated, thereby providing power to the load per that first PCU's power curve 902. As the DC-DC bus voltage (thereby power available) continues to increase, for a time period 916 to 918, a second PCU's unipolar power converter may be enabled, also increasing its power as illustrated by power curve 904 as the DC-DC bus voltage, hence power available, increases. Total power to the load 924 may be the combined power of the first and second PCU's unipolar power converters for the second period of time, from time 916 to 918. Subsequent PCU's may be activated as power increases. A third PCU's unipolar power converter may be activated in a third time period from time 918 to 920, thereby providing its power illustrated by power curve 906. A fourth PCU's unipolar power converter may be activated in a fourth time period from time 920 to 922, thereby providing its power illustrated by power curve 908. After time 922 a fifth PCU's unipolar power converter may be activated, thereby providing its power illustrated by power curve 910.

In an embodiment each subsequent PCU's unipolar power converter may be enabled at a certain DC-DC voltage before the previously enabled PCU's unipolar power converter has reached its maximum efficiency condition 912. As illustrated in FIG. 9, all units may have the same point of maximum efficiency 912, though in operation a given PCU's unipolar power converter may have a different maximum efficiency point than another PCU's unipolar power converter. As the DC-DC voltage continues to increase, more and more PCU's unipolar power converters may be enabled, each before a previous such unit has attained its maximum efficiency condition in order to provide a smooth transition. Correspondingly, as each PCU's unipolar power converter is enabled, the total (combined) power for the system may increase, as illustrated by the individual power curves 902, 904, 906, 908, and 910 at each corresponding transition (trigger) point 914, 916, 918, 920, and 922 respectively, reflected in the total power curve 924.

In an alternative embodiment each PCU's unipolar power converter may be configured to begin operation at a unique DC-DC bus voltage value (trigger value), thereby creating the staggered enablement effect illustrated in FIG. 9. In another alternative embodiment, the unipolar power converter of the PCU physically closest to a combiner enclosure may be the first to be enabled, then the next closest and so on. This strategy may provide an efficiency improvement by minimizing the connecting wire lengths, hence resistive losses. In a still further alternative embodiment, a control strategy may rotate the assigned trigger voltages amongst the PCU's such that no one unipolar power converter may be operated more overall hours than any other unipolar power converter. In this manner, damage to a unipolar power converter resulting from more use than other unipolar power converters may be avoided. In the various embodiments, the assigned trigger points may be changed at any interval, such as each operating day.

The embodiments illustrated in FIG. 9 may also be employed when full insolation may be available, but when the load, for example a grid, may not demand the entire available output. As the load demand decreases the number of activated unipolar power converters may be decreased according to a predetermined schedule. As the load demand may later increase, additional unipolar power converters may be re-enabled. As an example, decreasing approach may be used at the end of the day as solar insolation decreases during sun set.

The maximum power needed from the plant may be determined by the curve 924 illustrated in FIG. 9. This may correspond to operating the boost in maximum voltage mode: if the link voltage Vlink is greater than the target limit, the MPPT target may be disabled and the unipolar power converter input power may be reduced by some amount (the input voltage target is increased such that the panel current and power decreases). If later the DC link 109 voltage Vlink goes lower, then the input target voltage to the unipolar power converter may be increased gradually until it reaches MPP voltage and the MPPT operation may resume.

In an alternative embodiment, power may be demanded of the system in excess of that provided by controlling all available PCU's and their associated unipolar power converters to their maximum efficiency condition. In response the unipolar power converters may be controlled to a higher power configuration at the sacrifice of some efficiency until such time as all unipolar power converters reach their predetermined maximum power condition. As an example, the maximum efficiency point for the PVs connected to the PCUs may be at approximately 150 watts, and the maximum power allowed may be 240 watts. The maximum power may be the maximum the electronics can support, or it may be a predetermined value beyond which damage may result.

In an embodiment, if the unipolar power converter of a given PCU is not working (for example, is stopped due to a fault), the incoming power from that PCU's corresponding DC-DC converter and the other PCUs' DC-DC converters may be provided to the other unipolar power converters of the other PCUs of the same phase, enabled according to their assigned trigger voltage.

In the various embodiments less than all DC-DC converters may be connected in parallel. In the various embodiments unipolar power converters may be active at any given moment. As the power requirement of a load, for example a power grid, may be less than the full power available from the plant, or the input power available may be enabled below that required for peak output power, some portion of unipolar power converters may not be enabled, thereby allowing each operating unipolar power converter to operate at its own peak efficiency.

Figure 10:
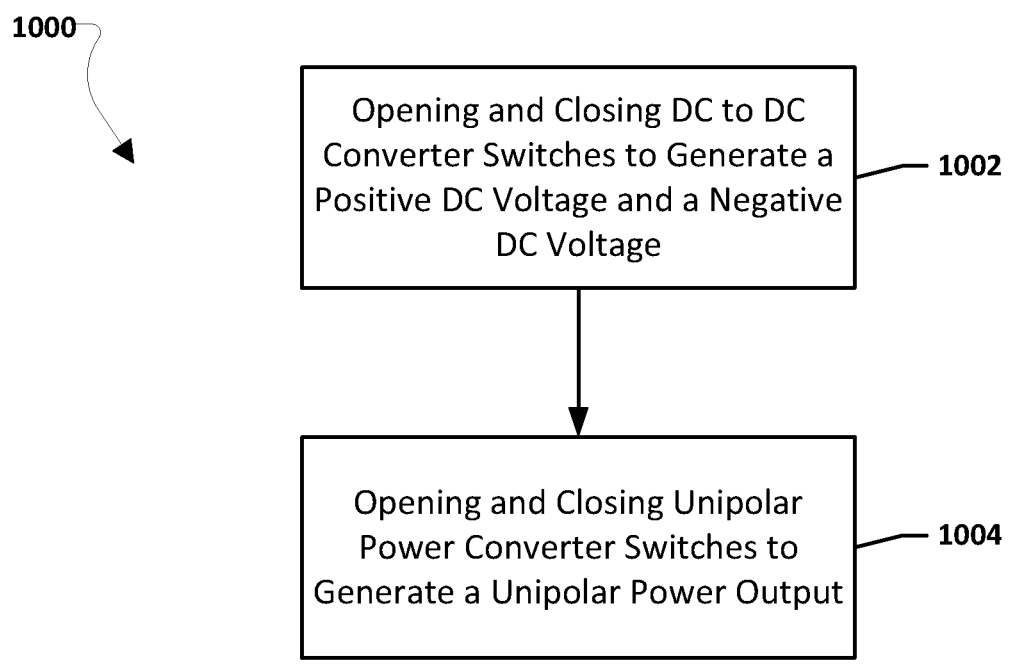
FIG. 10 is a process flow diagram illustrating an embodiment method for power converter unit control.

FIG. 10 illustrates an embodiment method 1000 for generating a positive DC voltage, a negative DC voltage, and a unipolar power output with a PCU. As an example the PCU may be the PCU 102 described above with reference to FIGS. 1 and 5. The method 1000 may be implemented by the controller 107 of a PCU 102. At block 1002 the controller 107 may open and close DC to DC converter switches to generate a positive DC voltage and a negative DC voltage. As an example, the controller 107 may open and close switches 506 and 508 of the DC to DC converter 104 to generate a positive DC voltage and a negative DC voltage. At block 1004 the controller 107 may open and close unipolar power converter switches to generate a unipolar power output. As an example, the controller 107 may open and close switches 512 and 514 to generate a unipolar power output.

Figure 11:
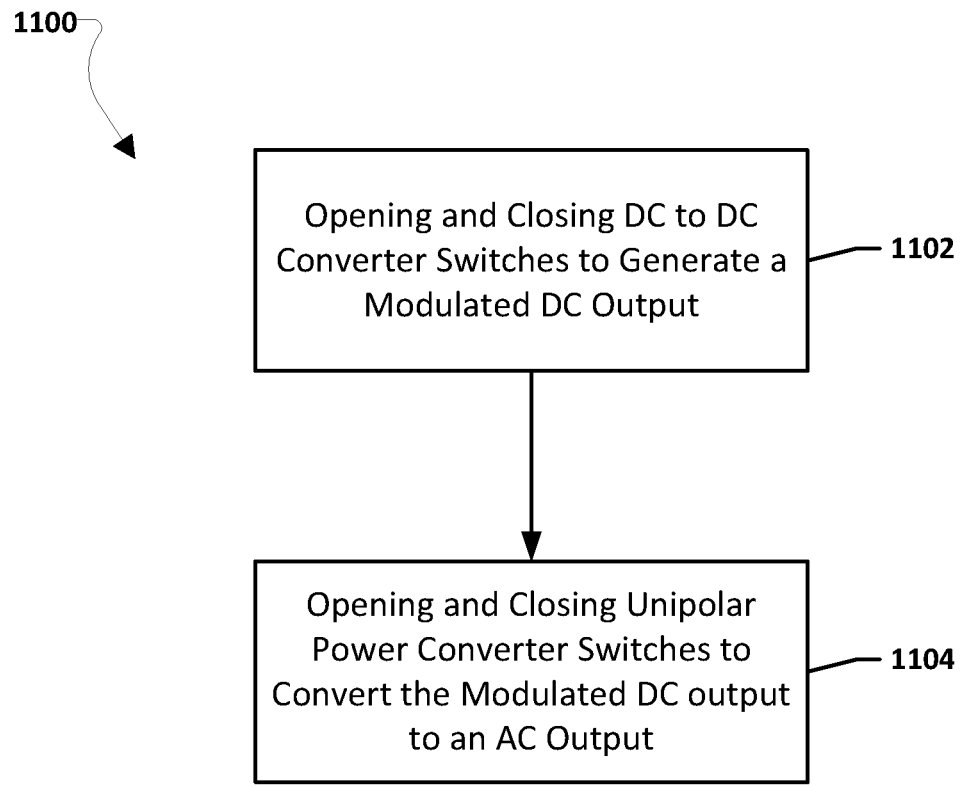
FIG. 11 is a process flow diagram illustrating another embodiment method for power converter unit control.

FIG. 11 illustrates an embodiment method 1100 for generating a modulated DC output and an AC output with a PCU. As an example the PCU may be the PCU 102 described above with reference to FIGS. 1 and 5. The method 1100 may be implemented by the controller 107 of a PCU 102. At block 1102 the controller 107 may open and close DC to DC converter switches to generate a modulated DC output. As an example, the controller 107 may open and close switches 506 and 508 of the DC to DC converter 104 to generate a modulated DC output. At block 1104 the controller 107 may open and close unipolar power converter switches to convert the modulated DC output to an AC output. As an example, the controller 107 may open and close switches 512 and 514 to convert the modulated DC output to an AC output.

Figure 12:
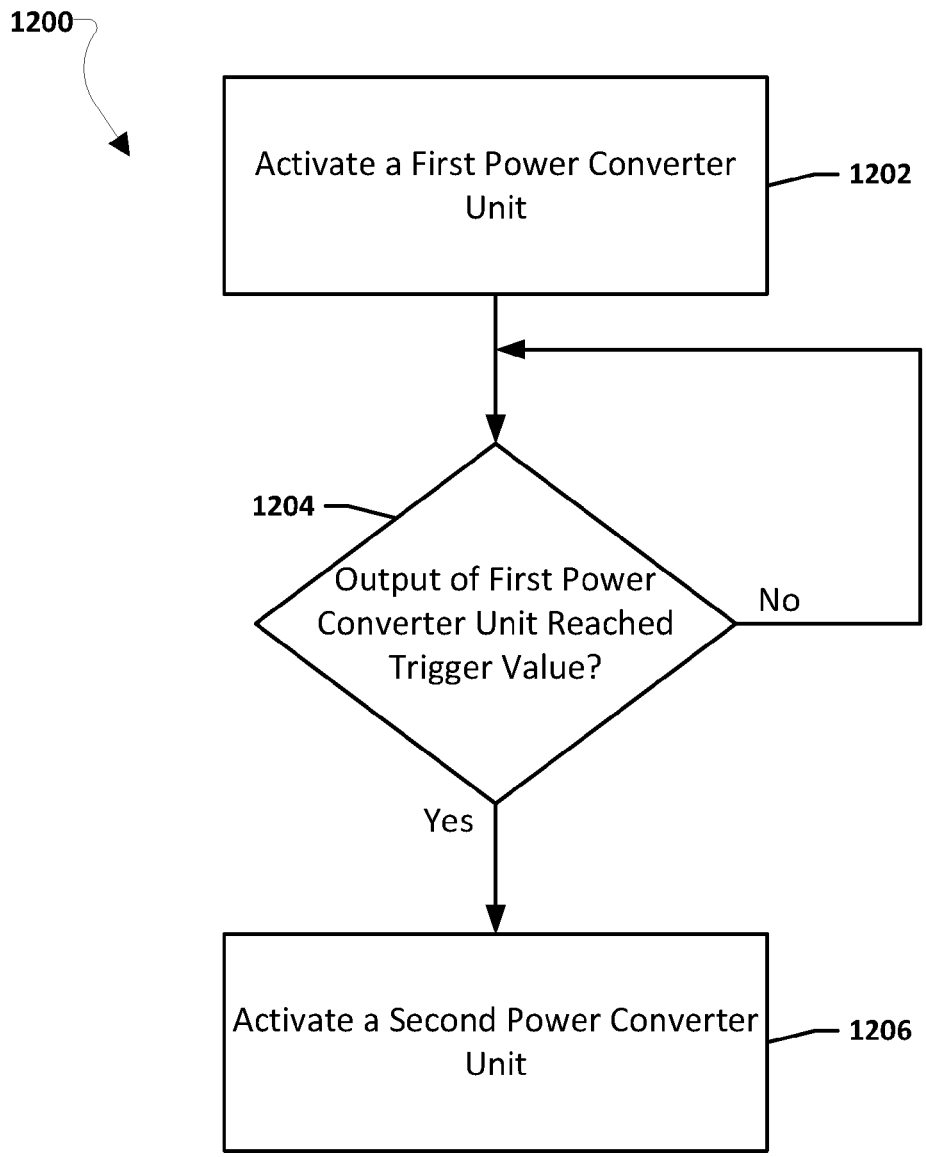
FIG. 12 is a process flow diagram illustrating an embodiment method for power converter unit activation.

FIG. 12 illustrates an embodiment method 1200 for operating a power generation system comprising a plurality of PCUs connected in parallel. As an example, the power generation system may be the power generation system 200 described above with reference to FIG. 2. The method 1100 may be implemented by the controller 142 of the combiner enclosure 114. At block 1202 the controller 142 may activate a first PCU. As an example the controller 142 may activate PCU 102A via a communication signal on lines 116A and/or 118A. At determination block 1204 the controller 142 may monitor the output of the first PCU to determine if the output of the first PCU has reached a trigger value. A trigger value may be any value, such as a voltage value or a maximum power level. If the trigger value is not reached (i.e., determination block 1204="No"), the controller 142 may continue to monitor the output of the first PCU. If the trigger value is reached (i.e., determination block 1204="Yes"), at block 1206 the controller 142 may activate a second PCU. As an example, the controller 142 may activate a second PCU 102B via a communication signal on lines 116B and/or 118B.

Figure 13:
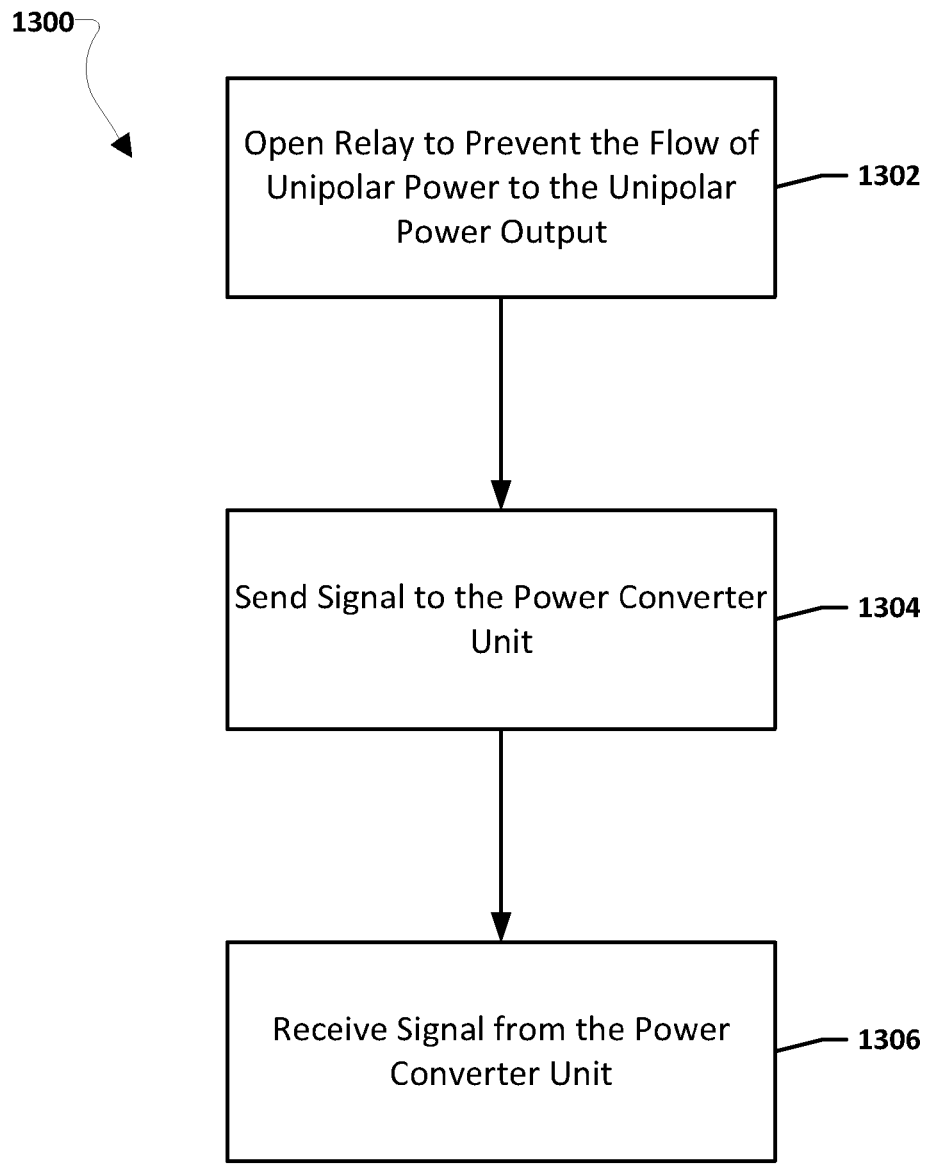
FIG. 13 is a process flow diagram illustrating an embodiment combiner enclosure control method.

FIG. 13 illustrates an embodiment method 1300 for controlling the operation of a combiner enclosure to prevent the flow of unipolar power to a unipolar power output. As an example, the combiner enclosure may be the combiner enclosure 114 of power generation system 100 described above with reference to FIG. 1. The method 1300 may be implemented by the controller 142 of the combiner enclosure 114. At block 1302 the controller 142 may open a relay to prevent the flow of unipolar power to the unipolar power output. As an example, controller 142 may open relay 126 via a control signal on line C. At block 1304 the controller 142 may send a signal to the PCU. As an example, the controller 142 may send a signal to the PCU 102 via lines 116 and/or 118. As an example, the signal from the controller 142 to the PCU 102 may be an indication to stop the generation of unipolar power at the PCU 102. At block 1306 the controller 142 may receive a signal from the PCU 102. As an example, the controller 142 may receive a signal from the PCU 102 via lines 116 and/or 118. As an example, the signal from the PCU 102 may be an indication that the PCU 102 has stopped generating unipolar power.

The various embodiments described herein may be useful for controlling any source of direct current and converting the direct current to three phase alternating current. Examples of direct current sources include solar panel, wind turbine, battery, geothermal, tidal, hydroelectric, thermoelectric and piezoelectric power systems. For the purpose of discussion, the example of a solar system embodiment is used as an example for describing the functioning and capabilities of the various embodiments. However, one skilled in the art would recognize that the circuits and processes described herein may be applied to other direct current sources as well. Accordingly, the scope of the claims should not be limited to solar power applications except as expressly recited in the claims.

The foregoing method descriptions and the process flow diagrams are provided merely as illustrative examples and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, programmable controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, programmable logic arrays, or any combination thereof. If implemented in software, the functions may be stored on or transmitted over as one or more instructions or code on a computer-readable medium. The steps of a method or algorithm disclosed herein may be embodied in a processor-executable software module executed which may reside on a tangible non-transitory computer-readable medium or processor-readable medium. Non-transitory computer-readable and processor-readable media may be any available media that may be accessed by a computer or processor. By way of example, and not limitation, such non-transitory computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A power generation system comprising: a first direct current ("DC") source; a first power converter unit connected to the first DC source, wherein the first power converter unit comprises a first positive DC line, a first negative DC line, and a first unipolar power line; and a combiner enclosure connected to the first power converter unit by the first positive DC line, the first negative DC line, and the first unipolar power line, wherein the combiner enclosure comprises a positive DC output, a negative DC output, and a unipolar power output, wherein the unipolar power output comprises a voltage offset from a ground electrical potential such that the voltage of the unipolar power output is positive with respect to the ground electrical potential, and wherein the voltage of the unipolar power output has a non-zero frequency, wherein the first power converter unit comprises a DC to DC converter configured to output a positive DC voltage to the first positive DC line and a negative DC voltage to the first negative DC line; and a unipolar power converter connected to the DC to DC converter, wherein the unipolar power converter is configured to output unipolar power to the first unipolar power line, wherein the combiner enclosure further comprises a relay connected between the first unipolar power line and the unipolar power output, the relay configured to prevent the flow of unipolar power to the unipolar power output when opened; a memory; and a processor coupled to the memory and the relay, wherein the processor is configured with the processor-executable instructions to perform operations comprising opening the relay to prevent the flow of unipolar power to the unipolar power output.

2. The power generation system of claim 1, wherein the processor is coupled to the first positive DC line and the first negative DC line, and wherein the processor is configured with processor-executable instructions to perform operations further comprising: sending a signal to the first power converter unit via the first positive DC line and the first negative DC line; and receiving a signal from the first power converter unit via the first positive DC line and the first negative DC line.

3. The power generation system of claim 1, wherein the first power converter unit further comprises:
a direct current ("DC") to DC converter comprising:
a positive input terminal;
a negative input terminal;
a first capacitor, wherein an input terminal of the first capacitor is connected to the positive input terminal and an output terminal of the first capacitor is connected to the negative input terminal;
a first coil, wherein an input terminal of the first coil is connected to the input terminal of the first capacitor;
a first switch, wherein an input terminal of the first switch is connected to an output terminal of the first coil and an output terminal of the first switch is connected to the negative input terminal;
a second switch, wherein an input terminal of the second switch is connected to the output terminal of the first coil;
a second capacitor, wherein an input terminal of the second capacitor is connected to an output terminal of the second switch and an output terminal of the second capacitor is connected to the negative input terminal;
a positive DC output terminal connected to the input terminal of the second capacitor, wherein the positive DC output terminal is connected to the first positive DC line; and
a negative DC output terminal connected to the output terminal of the second capacitor, wherein the negative DC output terminal is connected to the first negative DC line;
a unipolar power converter comprising:
a second coil, wherein an input terminal of the second coil is connected to the input terminal of the second capacitor;
a third switch, wherein an input terminal of the third switch is connected to an output terminal of the second coil;
a fourth switch, wherein an input terminal of the fourth switch is connected to the output terminal of the second capacitor and an output terminal of the fourth switch is connected to an output terminal of the third switch;

a third coil, wherein an input terminal of the third coil is connected to the output terminal of the third switch and the output terminal of the fourth switch;

a third capacitor, wherein an input terminal of the third capacitor is connected to an output terminal of the third coil and an output terminal of the third capacitor is connected to the input terminal of the fourth switch; and a unipolar power output terminal connected to the input terminal of the third capacitor, wherein the unipolar power output terminal is connected to the first unipolar power line; and a controller coupled to the first, second, third, and fourth switches, wherein the controller is configured to control the operation of each switch to generate a positive DC voltage at the positive DC output terminal, a negative DC voltage at the negative DC output terminal, and unipolar power at the unipolar power output terminal.

4. The power generation system of claim 1, further comprising:

a second direct current ("DC") source; and a second power converter unit connected to the second DC source, wherein the second power converter unit comprises a second positive DC line, a second negative DC line, and a second unipolar power line, and wherein the second positive DC line is connected to the first positive DC line, the second negative DC line is connected to the first negative DC line, and the second unipolar power line is connected to the first unipolar power line.

5. The power generation system of claim 1, further comprising:

a second direct current ("DC") source; and a second power converter unit connected to the second DC source, wherein the second power converter unit comprises a second positive DC line, a second negative DC line, and a second unipolar power line, wherein the second positive DC line is connected to the first positive DC line and the second negative DC line is connected to the first negative DC line, wherein the combiner enclosure is connected to the second power converter unit by the second unipolar power line, and wherein the combiner enclosure further comprises a second unipolar power output.

6. The power generation system of claim 5, further comprising:

a third direct current ("DC") source; and a third power converter unit connected to the third DC source, wherein the third power converter unit comprises a third positive DC line, a third negative DC line, and a third unipolar power line, wherein the third positive DC line is connected to the first positive DC line and the third negative DC line is connected to the first negative DC line, wherein the combiner enclosure is connected to the third power converter unit by the third unipolar power line, and wherein the combiner enclosure further comprises a third unipolar power output.

7. The power generation system of claim 1, wherein the first DC source is a photovoltaic panel.

8. The power generation system of claim 1, wherein the combiner enclosure further comprises an energy storage device connected between the first positive DC line and the first negative DC line.

9. The power generation system of claim 8, wherein the energy storage device is one of capacitor or a bidirectional battery charger.

10. The power generation system of claim 1, further comprising a second power converter unit connected to the first DC source, wherein the second power converter unit comprises a second positive DC line, a second negative DC line, and a second unipolar power line, wherein the second positive DC line is connected to the first positive DC line and the second negative DC line is connected to the first negative DC line, wherein the combiner enclosure is connected to the second power converter unit by the second unipolar power line, and wherein the combiner enclosure further comprises a second unipolar power output.

11. The power generation system of claim 10, further comprising a third power converter unit connected to the first DC source, wherein the third power converter unit comprises a third positive DC line, a third negative DC line, and a third unipolar power line, wherein the third positive DC line is connected to the first positive DC line and the third negative DC line is connected to the first negative DC line, wherein the combiner enclosure is connected to the third power converter unit by the third unipolar power line, and wherein the combiner enclosure further comprises a third unipolar power output.

12. The power generation system of claim 1, wherein the voltage of the unipolar power output is always positive with respect to the ground electrical potential.

* * * * *